US012767894B2

(12) United States Patent
Schucker et al.

(10) Patent No.: US 12,767,894 B2
(45) Date of Patent: Oct. 20, 2026

(54) SYSTEMS AND METHODS FOR PROCESSING MIXED PLASTIC WASTE

(71) Applicant: SABIC Global Technologies B.V., Bergen op Zoom (NL)

(72) Inventors: Robert C. Schucker, Sugar Land, TX (US); Jason Loiland, Sugar Land, TX (US); Dustin Farmer, Sugar Land, TX (US); Ravichander Narayanaswamy, Bangalore (IN); Alexander Stanislaus, Bangalore (IN); Tayirjan Isimjan, Jeddah (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 270 days.

(21) Appl. No.: 18/573,056

(22) PCT Filed: Jun. 29, 2022

(86) PCT No.: PCT/US2022/073249

§ 371 (c)(1),
(2) Date: Dec. 21, 2023

(87) PCT Pub. No.: WO2023/279019

PCT Pub. Date: Jan. 5, 2023

(65) Prior Publication Data

US 2024/0218257 A1 Jul. 4, 2024

Related U.S. Application Data

(60) Provisional application No. 63/202,884, filed on Jun. 29, 2021.

(51) Int. Cl.
*C10G 1/10* (2006.01)
*B01J 21/06* (2006.01)
(Continued)

(52) U.S. Cl.
CPC .............. *C10G 1/10* (2013.01); *B01J 21/066* (2013.01); *B01J 21/08* (2013.01); *B01J 31/122* (2013.01);
(Continued)

(58) Field of Classification Search
CPC . C10G 1/10; B01J 21/066; B01J 21/08; B01J 31/122; B01J 35/397; B01J 35/612; B01J 35/613; B01J 2231/641
See application file for complete search history.

(56) References Cited

U.S. PATENT DOCUMENTS

| | | | |
|---|---|---|---|
| 4,108,730 | A | 8/1978 | Chen et al. |
| 4,465,584 | A | 8/1984 | Effron et al. |

(Continued)

FOREIGN PATENT DOCUMENTS

| | | | |
|---|---|---|---|
| CN | 101578234 | A | 11/2009 |
| CN | 102015583 | A | 4/2011 |

(Continued)

OTHER PUBLICATIONS

Extended European search report for European application No. 22834400.8, mailed Apr. 11, 2025.

(Continued)

*Primary Examiner* — Tam M Nguyen
(74) *Attorney, Agent, or Firm* — Womble Bond Dickinson (US) LLP

(57) ABSTRACT

Systems and methods for processing mixed plastic waste may include one or more reactive extruders to initially dechlorinate and depolymerize the mixed plastic waste and a catalytic reactive distillation column to further process the dechlorinated, depolymerized mixed plastic waste. Depolymerization of the mixed plastic waste through one or more of the disclosed systems and methods produces and enhances the yield of at least a naphtha blend stock.

12 Claims, 2 Drawing Sheets

(51) Int. Cl.

| | |
|---|---|
| ***B01J 21/08*** | (2006.01) |
| ***B01J 31/12*** | (2006.01) |
| ***B01J 35/30*** | (2024.01) |
| ***B01J 35/61*** | (2024.01) |

(52) U.S. Cl.

CPC ........... *B01J 35/397* (2024.01); *B01J 35/612* (2024.01); *B01J 35/613* (2024.01); *B01J 2231/641* (2013.01); *C10G 2300/1003* (2013.01); *C10G 2300/4006* (2013.01); *C10G 2300/4012* (2013.01); *C10G 2300/4081* (2013.01); *C10G 2300/706* (2013.01); *C10G 2300/708* (2013.01); *C10G 2300/807* (2013.01)

(56) References Cited

U.S. PATENT DOCUMENTS

| | | | | |
|---|---|---|---|---|
| 5,288,934 | A | 2/1994 | de Broqueville | |
| 5,569,801 | A | 10/1996 | de Broqueville | |
| 6,011,187 | A | 1/2000 | Horizoe et al. | |
| 10,829,696 | B2 * | 11/2020 | Javeed .................. | C10G 1/002 |
| 2003/0199718 | A1 | 10/2003 | Miller | |
| 2012/0310023 | A1 * | 12/2012 | Huang .................. | C10G 1/002 585/241 |
| 2015/0080624 | A1 * | 3/2015 | Gephart ................ | C10G 19/00 422/200 |
| 2016/0362609 | A1 * | 12/2016 | Ward .................... | C10G 69/02 |
| 2018/0002609 | A1 * | 1/2018 | Narayanaswamy ..... | C10G 1/02 |
| 2019/0233744 | A1 | 8/2019 | Narayanaswamy et al. | |
| 2020/0071619 | A1 | 3/2020 | Humphreys et al. | |
| 2020/0277530 | A1 * | 9/2020 | Wang ..................... | B01J 8/0278 |
| 2021/0380887 | A1 * | 12/2021 | Kim ........................ | C10G 1/10 |
| 2022/0402860 | A1 * | 12/2022 | Slivensky ............... | C10G 3/40 |

FOREIGN PATENT DOCUMENTS

| | | | | |
|---|---|---|---|---|
| CN | 104293368 | | 1/2015 | |
| CN | 104611060 | B | 8/2016 | |
| CN | 106118707 | | 11/2016 | |
| CN | 106164223 | A | 11/2016 | |
| CN | 108291156 | A | 7/2018 | |
| CN | 109642164 | A | 4/2019 | |
| CN | 109844070 | A | 6/2019 | |
| CN | 110139915 | A | 8/2019 | |
| EP | 0571163 | A1 * | 11/1993 | ............... B01D 3/20 |
| EP | 0599795 | B1 | 9/1999 | |
| GB | 1577464 | A | 10/1980 | |
| JP | H07-138576 | | 5/1995 | |
| JP | H08127780 | A | 5/1996 | |
| WO | 2017152205 | A1 | 9/2017 | |
| WO | 2021/105327 | | 6/2021 | |

OTHER PUBLICATIONS

International Search Report for international application No. PCT/US2022/073249, mailed on Sep. 6, 2022.

* cited by examiner

SYSTEMS AND METHODS FOR PROCESSING MIXED PLASTIC WASTE

CROSS-REFERENCE TO RELATED APPLICATIONS

This application is a U.S. National Phase Under 35 U.S.C. § 371 of International Application No. PCT/US2022/073249, titled "SYSTEMS AND METHODS FOR PROCESSING MIXED PLASTIC WASTE," filed on Jun. 29, 2022, which claims the benefit of and priority to U.S. Provisional Application No. 63/202,884, filed on Jun. 29, 2021, the contents of which are incorporated herein by reference in their entirety and for all purposes.

TECHNICAL FIELD

The disclosure herein relates to systems and methods useful for processing mixed plastic waste and in particular, systems and methods useful for converting mixed plastic waste into high quality naphtha. This naphtha is suitable as a feed to chemical processing operations, such as steam cracking, or refinery operations, such as fluid catalytic cracking.

BACKGROUND

Fluid catalytic cracking (FCC) processes are well-known and extensively used in the oil and gas industry to convert high boiling point, high molecular weight hydrocarbon fractions of petroleum crude oils into more valuable gasoline, olefinic gases, and other products. Historically, the cracking of petroleum hydrocarbons was conducted using thermal cracking techniques; however, catalytic cracking processes have more recently been implemented to produce byproduct gases having more carbon-carbon double bonds (i.e., olefins), which yield products with higher octane ratings and increased economic value.

Typically, the feedstock to an FCC process includes that portion of the crude oil having a boiling point of 340 °C or greater at atmospheric pressure and an average molecular weight ranging from about 200 to about 600, or greater. This feedstock portion of crude oil is often referred to as heavy gas oil or vacuum gas oil (HVGO). In the FCC process, this feedstock is heated to a high temperature and moderate pressure prior to being brought into contact with an FCC catalyst. The FCC catalyst, when contacting the feedstock, facilitates the breaking of long-chain molecules of the high boiling point hydrocarbon liquids into much shorter molecules that can subsequently be captured as a vapor exiting the FCC unit.

Common FCC catalysts may be provided in the form of fine powders that have a bulk density ranging from about 0.8 $g/cm^3$ to about 0.96 $g/cm^3$ and that are of varying particles sizes. For example, average particular sizes of FCC catalysts may range from about 10 to about 150 μm or about 60 to about 100 μm. Desirable FCC catalyst properties may include one or more of high activity levels, large pore sizes, good resistance to attrition, low coke production, and/or good stability when exposed to high temperatures and/or steam. FCC catalysts may also be in the form of crystalline zeolitic structures having various compositions and structures.

Fluid catalytic cracking processes may produce decant oil (commonly referred to as slurry oil, or heavy cat cycle oil) that exits the FCC product fractionation unit as the heaviest fraction. Decant oil is a refractory (i.e., essentially chemically inert) stream that has passed through the reactor multiple times such that it can no longer be converted via the catalytic cracking process. This decant oil stream is highly aromatic and is composed primarily of pericondensed multi-ring aromatic structures, e.g., such as methyl substituted phenanthrene, anthracene, pyrene, coronene and larger aromatic structures. These structures commonly include stable methyl groups that result from side chain cleavage during catalytic cracking and subsequent thermal treatment in the FCC unit. The decant oil stream generally contains residual, spent FCC catalyst (e.g., in small particulate form) upon exiting the FCC unit. While the spent FCC catalyst is not as active as fresh FCC catalyst, this spent catalyst does have some residual acidity and activity.

It is increasingly important in industry to develop ways to utilize certain waste and/or recyclable materials, such as such as mixed plastic waste (MPW). For example, the industrial thermal anaerobic conversion (TAC) can convert MPW to pyrolysis oil which, after appropriate cleanup steps, can be utilized as a feedstock to more traditional naphtha cracking systems. However, such conversion processes as currently conducted are inefficient semi-batch processes that produce a pyrolysis oil having a wide boiling range as well as numerous contaminants (e.g., O, N, S, Cl, Si, etc.). Due to the presence of these contaminants, the resulting pyrolysis oil stream must be distilled and hydrotreated prior to being fed to a naphtha cracker to produce ethylene and propylene. Such additional processing steps can result in the yield of naphtha range products being lower than desired. Further, batch pyrolysis units are typically smaller in scale, for example, requiring many units (e.g., about 10-15 units) to achieve the desired output. Thus, it would be desirable to provide processes for converting MPW that operate in continuous flow mode in the presence of an acid catalyst, which is capable of further cracking the initial decomposition products of thermal conversion to increase the yield of naphtha range products.

In addition, batch processes commonly used in industry for converting MPW to useful products, such as pyrolysis oils, require specialized equipment and processes that are not easily scalable in existing refineries and/or integrable into the existing processes in those refineries. For example, incorporation of such processes in existing refineries typically requires construction of expensive stand-alone pyrolysis reactors and hydrotreaters capable of processing the mixed plastic waste.

SUMMARY

Applicant has recognized the need for MPW conversion processes that would utilize equipment and processes, which are common to refineries. Such MPW processing can be integrated into existing refineries and would reduce the need for substantial construction costs, expanded footprints, or added equipment requirements. The disclosure herein provides one or more embodiments of systems and methods useful for processing mixed plastic waste to produce at least a naphtha product therefrom. In an embodiment, the disclosure provides a two-stage catalytic reactive distillation method for processing a mixed plastic waste input that involves introducing the mixed plastic waste into a reactive extrusion vessel held at a temperature sufficient to break down higher molecular weight polymers therein. Subsequently, the partially depolymerized product is mixed with a high boiling point solvent and a reaction catalyst and the combined mixture is fed to a multi-tray reactive distillation column where the partially depolymerized product undergoes further depolymerization in the presence of the reaction catalyst. One or more distillates can then be removed from the multi-tray reactive distillation column via one or more side streams. In one or more embodiments, at least one of the side streams contains a naphtha product.

In one or more aspects, the disclosure provides a method of processing a mixed plastic waste. In particular, such methods include introducing a mixed plastic waste that includes a plurality of plastic polymers into a first reactive extrusion vessel. Optionally, certain other embodiments of methods may include feeding the mixed plastic waste to a shredder prior to introducing the mixed plastic waste into the first reactive extrusion vessel. In such embodiments, the shredder can be positioned to shred the mixed plastic waste to provide a shredded mixed plastic waste. Such shredded mixed plastic waste may have an average size (i.e., length and/or diameter) of about 4 mm or less.

In some embodiments, the first reactive extrusion vessel may operate at a temperature sufficient to cause initial dechlorination of any chlorine-containing polymers in the plurality of plastic polymers. In certain embodiments, the temperature sufficient to cause initial dechlorination of any chlorine-containing polymers in the plurality of plastic polymers is between about 300 °C and about 350 °C. In one or more embodiments, the mixed plastic waste containing the plurality of plastic polymers is fed to a second reactive extrusion vessel. In some embodiments, the second reactive extrusion vessel operates at a temperature sufficient to cause initial depolymerization of a portion of the plurality of plastic polymers in the mixed plastic waste. In certain embodiments, the temperature sufficient to cause initial depolymerization of the plurality of plastic polymers in the mixed plastic waste is between about 400 °C and about 450 °C. In some embodiments, the pressure in the second reactive extrusion vessel ranges from about 1 to about 100 bar. After initial depolymerization, the extrusion product that exits the second reactive extrusion vessel may be mixed with a process solvent and a reaction catalyst to define a process feed stream. In some embodiments, the process solvent may include one or more of a carbon black oil, a heavy cat cycle oil, a vacuum gas oil, or any hydrocarbon with boiling point ranging from about 300 °C to about 565 °C. In an embodiment, the final boiling point of the carbon black oil is about 565 °C.

Subsequently, in some embodiments, the process feed stream may be fed to a multi-tray reactive distillation column, and more specifically, onto a tray of the multi-tray reactive distillation column. In such embodiments, the multi-tray reactive distillation column may be designed to facilitate further depolymerization of at least another portion of the plurality of plastic polymers in the process feed stream in the presence of the reaction catalyst. In some embodiments, the multi-tray reactive distillation column may provide countercurrent flow of the process feed stream downward through the multi-tray reactive distillation column and at least partially depolymerized plastic polymer vapors upward through the multi-tray reactive distillation column, thereby enhancing naphtha yield. In some embodiments, the reaction catalyst is a core-shell catalyst that has an active catalyst shell disposed on a non-porous core support and the active catalyst shell can have a surface area of about 5 to about 50 square meters per gram ($m^2/g$). In certain embodiments, the reaction catalyst may include a silica support that has a silica-alumina active catalyst layer of less than 10 nanometers thickness disposed thereon. In other embodiments, the reaction catalyst may include a sulfated zirconia catalyst and/or a calcium sulfate-supported trimetaphosphoric acid catalyst and/or a microporous cracking catalyst such as ZSM-5.

Methods according to the present disclosure may include removing a distillate via one or more distillate side streams connected to the multi-tray reactive distillation column. In some embodiments, for example, at least one of the distillate side streams may include naphtha. In addition, the multi-tray reactive distillation column may include a bottoms stream connected to a bottom end portion of the multi-tray reactive distillation column that is designed to remove a flow of the process solvent, unreacted plastic polymers, reaction catalyst, and coke therefrom. In one or more embodiments, at least a portion of the reaction catalyst and coke may be separated from the bottoms stream, for example, using one or more filters configured to receive a flow from the bottoms stream. In certain embodiments, a portion of the process solvent and the unreacted plastic polymers in the bottoms stream may be recovered and returned to the process to mix with the extrusion product that exits the reactive extrusion vessel. Thus, the process solvent may be effectively circulated through the multi-tray reactive distillation column with make-up process solvent (and additional catalyst) being added.

In one or more embodiments, methods of processing mixed plastic waste may include passing the process feed stream to a plug flow reactor positioned upstream of the multi-tray reactive distillation column, thereby providing an intermediate depolymerization step. In such embodiments, the plug flow reactor is operated for a time and at a temperature sufficient to cause depolymerization of at least a second portion of the plurality of plastic polymers in the process feed stream in the presence of the reaction catalyst to produce a reactor outlet stream. Subsequently, in some embodiments, the reactor outlet stream is then passed to the multi-tray reactive distillation column as described herein. For example, the reactor outlet stream is fed onto a tray of the multi-tray reactive distillation column. In one or more embodiments, the time and temperature sufficient to cause depolymerization of the at least the second portion of the plurality of polymers in the process feed stream is between about 30 to about 60 minutes and about 400 °C to about 450 °C.

In one or more embodiments, hydrogen chloride gas from the initial dechlorination of any chlorine-containing polymers in the plurality of plastic polymers may be fed to a gas-liquid contactor having an aqueous base contained therein. In such embodiments, the hydrogen chloride gas may be reacted with the aqueous base in the gas-liquid contactor to produce a non-volatile product. In one or more embodiments, at least a portion of the aqueous base may be added directly into the first reactive extrusion vessel to react with the hydrogen chloride gas generated during the initial dechlorination of any chlorine-containing polymers in the plurality of plastic polymers. In certain embodiments, one or more compounds may be introduced into the second reactive extrusion vessel in addition to the mixed plastic waste in order to facilitate depolymerization of the mixed plastic waste and to improve naphtha yield during the process. In some embodiments, for example, a hydrogen donor solvent may be added to the second reactive extrusion vessel (e.g., including the mixed plastic waste therein) causing a transfer of hydrogen from the hydrogen donor solvent to free radical compounds created during the initial depolymerization of the plurality of plastic polymers in the mixed plastic waste, thereby reducing heavier hydrocarbon product formation and increasing naphtha yield. In other embodiments, gaseous hydrogen, a transition metal catalyst, and a sulfur-containing compound may be added to the reactive extrusion vessel causing a transfer of hydrogen from the gaseous hydrogen to free radical compounds created during the initial depolymerization of the plurality of plastic polymers in the mixed plastic waste, thereby reducing heavier hydrocarbon product formation and increasing naphtha yield. The particular transition metal catalyst and/or sulfur-containing compound may vary. In some embodiments, for example, the transition metal catalyst may include molybdenum octoate or molybdenum naphthenate and the sulfur-containing compound may include butyl sulfide. In embodiments in which the process solvent is a vacuum gas oil, the about 0.5% to about 1.5% by weight sulfur found in the vacuum gas oil may act as the sulfur-containing compound described above. Moreover, if the vacuum gas oil has been hydrotreated to reduce its sulfur content, such vacuum gas oil will have hydrogen moieties to donate to free radicals as described above.

Other aspects of the present disclosure provide systems for processing a mixed plastic waste. Such systems are effective to provide depolymerization of the mixed plastic waste and recovery of naphtha therefrom. In one or more embodiments, such systems may include a first reactive screw extruder having an inlet into which a mixed plastic waste that includes a plurality of plastic polymers is supplied and an outlet. Typically, the first reactive screw extruder is a single screw extruder or a twin screw extruder; however, other configurations may be possible. In some embodiments, the first reactive screw extruder may be configured to heat the mixed plastic waste to a temperature sufficient to cause initial dechlorination of any chlorine-containing polymers in the plurality of plastic polymers. For example, the temperature sufficient to cause initial dechlorination of any chlorine-containing polymers in the plurality of plastic polymers may be between about 300 °C and about 350 °C or between about 300 °C and about 325 °C. Optionally, in some embodiments, systems as described herein may include a shredder positioned upstream of the first reactive screw extruder. The shredder has an inlet to receive bales of raw mixed plastic waste and an outlet. The shredder is operable to shred the bales of raw mixed plastic waste and provide a shredded mixed plastic waste through the outlet, which is subsequently fed to the first reactive screw extruder. In some embodiments, the shredded mixed plastic waste can have an average size (i.e., length/diameter) of about 4 mm or less.

In some embodiments of the systems, a first extrusion product stream may be connected to and in fluid communication with the outlet of the first reactive screw extruder to receive a first extrusion product therefrom that includes the mixed plastic waste. In one or more embodiments, the system includes a second reactive screw extruder having an inlet that receives the first extrusion product stream and an outlet. In such embodiments, the second reactive screw extruder is configured to heat the mixed plastic waste of the first extrusion product stream to a temperature sufficient to cause initial depolymerization of a portion of the plurality of plastic polymers. For example, the temperature sufficient to cause initial depolymerization of the portion of the plurality of plastic polymers may be between about 400 °C and about 450 °C. In some embodiments, the system includes a second extrusion product stream connected to and in fluid communication with the outlet of the second reactive screw extruder to receive a second extrusion product therefrom. The system may also include a first separation unit having an inlet connected to and in fluid communication with the second extrusion product stream and an outlet. The first separation unit may be configured to separate the second extrusion product stream into a solids material and a separated extrusion product. The solids material may be purged from the first separation unit through a purge stream.

In one or more embodiments, a separated extrusion product stream is connected to and in fluid communication between the outlet of the first separation unit and a first inlet of a junction and enables flow of the separated extrusion product from the first separation unit to the junction. The junction also has a second inlet that receives a process solvent and a reaction catalyst therethrough. In an embodiment, the junction is configured to mix the separated extrusion product, the process solvent, and the reaction catalyst to define a process feed stream. The type of process solvent used according to the systems described herein may vary. For example, in some embodiments, the process solvent may include one or more of a carbon black oil or a mid-boiling range (300 °C-565 °C) cut of a carbon black oil, a heavy cat cycle oil, a vacuum gas oil or any hydrocarbon with boiling point ranging from about 300 °C to about 565 °C. In some embodiments, the reaction catalyst can be one or more of a microporous cracking catalyst, a silica-alumina silica-supported catalyst having an active catalyst layer of less than 10 nanometers, a sulfated zirconia catalyst, and a calcium sulfate-supported trimetaphosphoric acid catalyst.

In certain embodiments, systems may include a multi-tray reactive distillation column having a feed stream inlet that receives the process feed stream from the junction. In certain embodiments, the multi-tray reactive distillation column may provide countercurrent flow of the process feed stream (i.e., including extrusion product, process solvent, and reaction catalyst) downward through the multi-tray reactive distillation column and at least partially depolymerized plastic polymer vapors upward through the multi-tray reactive distillation column. Typically, the multi-tray reactive distillation column includes a plurality of side streams connected to and in fluid communication with the multi-tray reactive distillation column. In some embodiments, for example, at least one of the plurality of side streams may be arranged to draw naphtha from the multi-tray reactive distillation column. In addition to the plurality of side streams, the multi-tray reactive distillation column may also include a bottoms stream connected to and in fluid communication with the multi-tray reactive distillation column proximate to a bottom portion thereof. In some embodiments, the bottoms stream may be configured to receive a flow that includes the process solvent, unreacted plastic polymers, reaction catalyst, and coke.

In certain embodiments, the system may include a plug flow reactor positioned between the first separation unit and the multi-tray reactive distillation column. In such embodiments, the plug flow reactor includes a reactor inlet in fluid communication with the junction to receive the process feed stream therefrom. The plug flow reactor may also have a reactor outlet in fluid communication with the feed stream inlet of the multi-tray reactive distillation column.

In certain embodiments, the systems may also include a second separation unit. In some embodiments, the second separation unit is connected to and in fluid communication with the bottoms stream such that the second separation unit separates at least a portion of the coke and reaction catalyst from the bottoms stream. The type of separation unit may vary based on the desired degree of separation and/or based on certain process parameters. In some embodiments, for example, the separation unit may include at least one of a ceramic filter, a metal filter, a centrifuge or a settling tank. In some embodiments, the system may also include a recycle stream connected to and in fluid communication between the second separation unit and the junction to return at least a portion of the process solvent and unreacted plastic polymers in the bottoms stream to the junction. In certain embodiments, the system may also include a make-up stream connected to and in fluid communication with the recycle stream to introduce make-up process solvent and make-up reaction catalyst therein. In such embodiments, the make-up stream may be in fluid communication with the separated extrusion product stream.

In certain embodiments, the system may include a gas-liquid contactor connected to and in fluid communication with the first reactive screw extruder. For example, the gas-liquid contactor can be designed to convert gaseous hydrogen chloride received from the first reactive screw extruder to a recoverable non-volatile product, the gaseous hydrogen chloride being evolved in the first reactive screw extruder from depolymerization of chlorine-containing polymers in the mixed plastic waste. In certain embodiments, the systems described herein may include a reboiler connected to and in fluid communication with at least a portion of the bottoms stream. In such embodiments, the reboiler can be configured to vaporize at least some of the bottoms stream to produce a vapor that is reinjected onto a lower tray of the multi-tray reactive distillation column.

These and other features, aspects, and advantages of the disclosure will be apparent from a reading of the following detailed description together with the accompanying drawings, which are briefly described below. Embodiments include any combination of two, three, four, or more features or elements as set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWINGS

Having thus described the disclosure in general terms, reference will now be made to the accompanying drawings, which are not necessarily drawn to scale.

Figure 1:
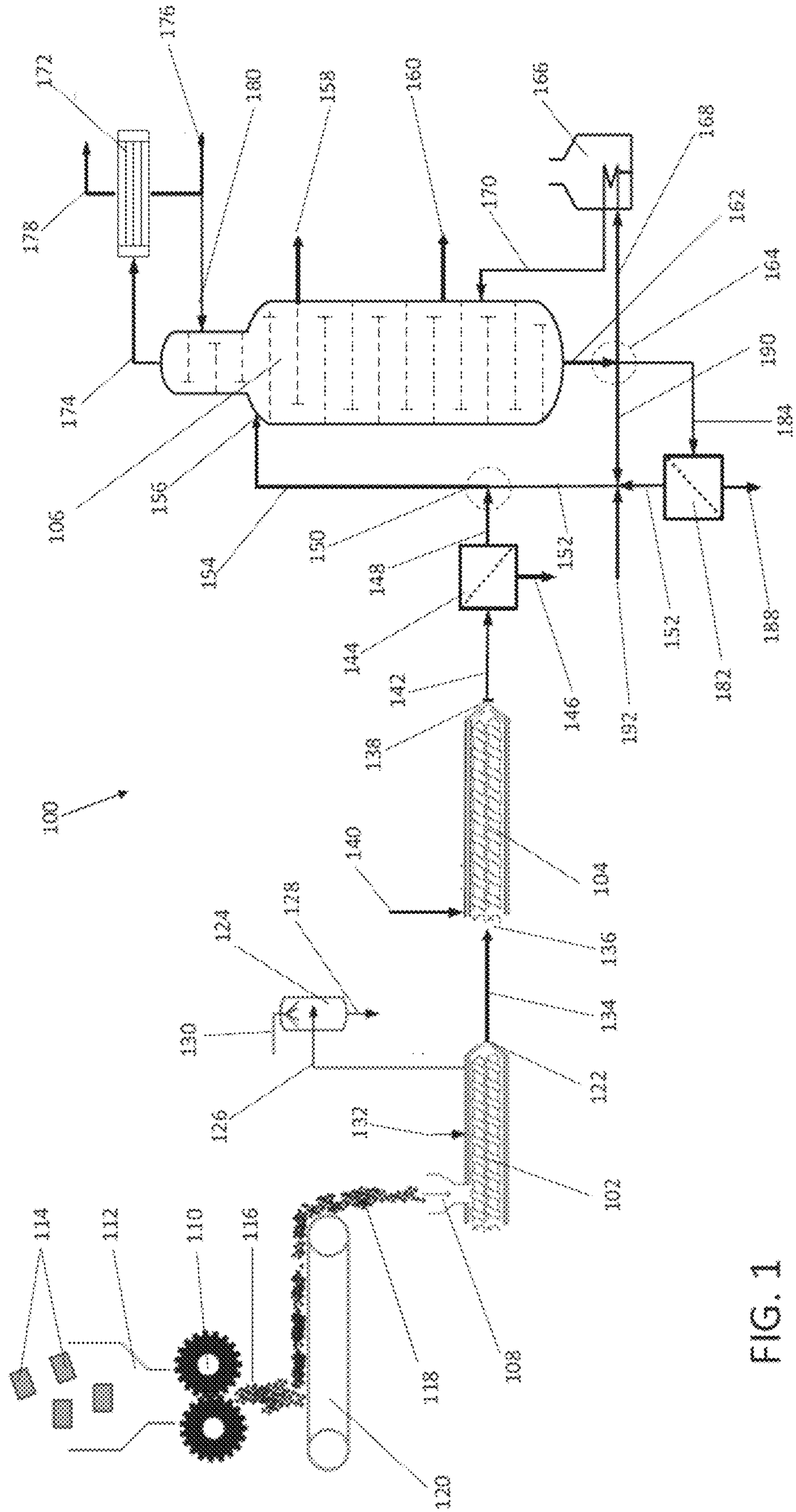
Figure 2:
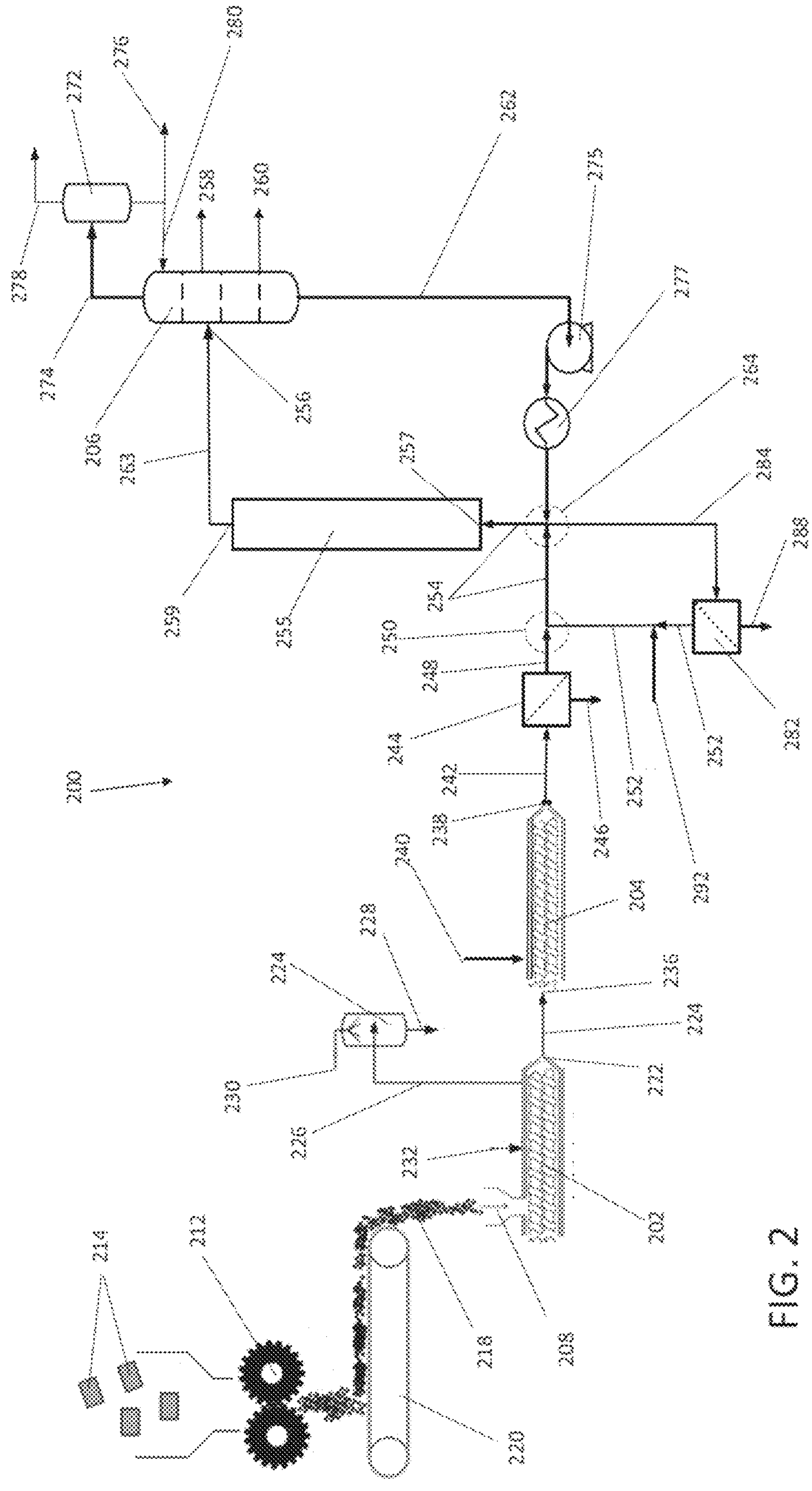

FIG. 1 is a schematic diagram of a system for processing mixed plastic waste including two reactive extrusion vessels and a multi-tray reactive distillation column, according to an embodiment of the present disclosure; and FIG. 2 is a schematic diagram of a system for processing mixed plastic waste including two reactive extrusion vessels, a plug flow reactor, and a multi-tray reactive distillation column, according to an embodiment of the present disclosure.

DETAILED DESCRIPTION

Methods and systems will be described more fully hereinafter with reference to specific embodiments and particularly to the various drawings provided herewith. The disclosure may be embodied in many different forms and should not be construed as limited to the embodiments set forth herein; rather, these embodiments are provided so that this disclosure will satisfy applicable legal requirements. As used in the specification, and in the appended claims, the singular forms “a,” “an,” “the,” include plural referents unless the context clearly dictates otherwise.

The disclosure herein provides embodiments of systems and methods useful for processing mixed plastic waste (MPW) to produce a naphtha product therefrom. In particular, and as will be discussed further herein, the disclosure provides a two-stage catalytic reactive distillation process for processing a mixed plastic waste. Certain embodiments of the systems and methods as described herein provide advantages when compared to typical thermal anaerobic conversion (TAC) processes for conversion of MPW as commonly used in industry and as would be understood by a person skilled in the art. For example, certain embodiments of the systems and methods of the present disclosure can be operated in continuous flow mode in the presence of an acid catalyst that is capable of further cracking the initial decomposition products of thermal conversion to increase the yield of naphtha range blend stock or product. In addition, the systems and methods disclosed herein are capable of utilizing equipment and processes that are common to existing refineries. Thus, the disclosed systems and methods can be more easily integrated into existing refineries without the need for construction of expensive stand-alone pyrolysis reactors and/or hydrotreaters as may be required using the common batch processes described above.

Generally, the methods and systems disclosed herein are effective to provide dechlorination and depolymerization of a mixed plastic waste input using, for example, one or more reactive screw extruders and subsequent recovery of a range of blend stocks, including naphtha blend stocks, from a multi-tray reactive distillation column. In some embodiments, the systems and methods provided herein utilize a heavy fraction from a fluid catalytic cracking (FCC) unit, known as decant oil, as a reactive process solvent for MPW. As noted above, decant oil is a refractory stream that exits an FCC unit, and due to the number of cycles through the FCC unit, can no longer be converted via the catalytic cracking process. However, the decant oil generally contains residual, spent FCC catalyst (e.g., in small particulate form). While the spent FCC catalyst is not as active as fresh FCC catalyst, this spent catalyst does have some residual acidity/activity that is capable of facilitating the catalytic cracking of MPW, in particular. In other embodiments, the reactive process solvent used in the catalytic cracking of MPW may be some other high boiling point process solvent that is readily available from an existing refinery process.

FIG. 1 is a diagrammatic representation of a non-limiting, system for processing mixed plastic waste 100 according to one or more embodiments of the disclosure. As shown in FIG. 1, the system includes a first reactive screw extruder 102, a second reactive screw extruder 104, and a multi-tray reactive distillation column 106. Typically, a mixed plastic waste feed that includes a plurality of different plastics, each composed of one or more plastic polymers, is supplied to the first reactive screw extruder 102 via an inlet 108 therein. As used herein, “mixed plastic waste” or “MPW” refers to any scrap or waste plastic or polymer material and combinations thereof. Non-limiting examples of mixed plastic waste materials include combinations of one or more of polypropylene (PP), polyethylene (PE), low density polyethylene (LDPE), high density polyethylene (HDPE), polyethylene terephthalate (PET), polystyrene (PS), polyvinyl chloride (PVC), polylactic acid (PA), acrylonitrile butadiene styrene (ABS), and/or other known plastics. In one or more embodiments, the mixed plastic waste fed to the first reactive screw extruder 102 has been sorted to include a majority of polyolefins, namely polyethylene and polypropylene.

In one or more other embodiments, systems as described herein may include a shredder 110 positioned upstream of the first reactive screw extruder 102. In such embodiments, the system may be designed to receive larger bales of raw mixed plastic waste that are broken down by the shredder to provide a shredded mixed plastic waste feed that is more manageable and which can then be fed to the first reactive screw extruder 102. For example, as depicted in FIG. 1, the shredder 110 may include an inlet 112 positioned to receive bales of raw mixed plastic waste 114 (or loose raw mixed plastic waste) and an outlet 116 that feeds a shredded mixed plastic waste 118 via a conveyer 120 to the inlet 108 of the first reactive screw extruder 102. The overall type or configuration of the shredder may vary. For example, any industrial plastic shredder or recycling machine capable of comminuting, or otherwise breaking down, raw mixed plastic waste would be suitable. Examples of suitable types of shredders include plastic shredder, plastic granulators, plastic grinders, purging grinders, scrap shredders, single or multiple rotor shredders, plastic refiners, waste processing systems, and the like. However, it should be noted that other configurations may be possible as would be understood by those persons having skill in the art. For example, given the wide range of shredder designs, dimensions, and process parameters, there are various shredder profiles and process functions that may be implemented to achieve the desired process requirements and/or the desired degree of breakdown of the raw mixed plastic waste. Raw mixed plastic waste occurs in a variety of sizes and shapes. Shredding generates a mixture of smaller sized products. Typically, the shredder is capable of breaking down the raw mixed plastic waste into a shredded mixed plastic waste having a length/diameter of about 100 mm or less, about 50 mm or less, about 10 mm or less, about 5 mm or less, about 4 mm or less, or about 2 mm or less.

In some embodiments, for example, the outlet 116 of the shredder may be connected to one or more additional components capable of transporting the shredded mixed plastic waste feed 118 from the outlet 116 of the shredder to the inlet 108 of the first reactive screw extruder 102. As depicted in FIG. 1, for example, the system may include a conveyor belt 120 positioned to receive the shredded mixed plastic waste feed 118 and transfer the shredded mixed plastic waste feed 118 to the inlet 108 of the first reactive screw extruder 102. While a conveyor belt is shown in the embodiment depicted in FIG. 1, this is not intended to be limiting and the particular equipment used to transfer the shredded mixed plastic waste from the outlet of the shredder to the first reactive screw extruder may vary. For example, any suitable conveying technology could be used in place of the conveyor belt depicted in FIG. 1 including, but not limited to, a rotary conveyor, an oscillating conveyor, one or more vibrating screens, a chute, a funnel, and/or any other loading or conveying system commonly used in the art.

As noted above, the system includes a first reactive screw extruder 102 having an inlet 108 positioned to receive a mixed plastic waste feed (e.g., such as the shredded mixed plastic waste feed 118) that includes a plurality of different plastics, each composed of plastic polymers, and an outlet 122 thereof. The first reactive screw extruder 102 may be configured to heat the mixed plastic waste feed to a temperature sufficient to cause initial dechlorination of any chlorine-containing polymers in the plurality of plastic polymers in the mixed plastic waste feed. "Dechlorination" generally refers to the process of removing chlorine atoms from chlorine-containing plastic polymers (e.g., polyvinyl chloride) in the mixed waste plastic as hydrogen chloride gas. Removal of the chlorine is needed to mitigate the formation of chlorine radicals that attack organic materials and form organochlorides, which can be highly corrosive to downstream equipment. The gaseous hydrogen chloride is generated during thermal decomposition of the chlorine-containing polymers within the first reactive extruder with such thermal decomposition being driven by entropy. The temperature sufficient to cause initial dechlorination may vary, for example, based on the types of plastics/polymers in the mixed plastic waste feed. In some embodiments, for example, the temperature within the first reactive screw extruder may be sufficient to remove substantially all chlorine from chlorine-based compounds in the mixed plastic waste. In some embodiments, the temperature sufficient to cause initial dechlorination of any chlorine-containing polymers in the plurality of plastic polymers may be between about 300 °C and about 350 °C, between about 300 °C and about 325 °C, between about 310 °C to about 340 °C, or between about 320 °C to about 330 °C. In certain embodiments, the temperature sufficient to cause initial dechlorination of any chlorine-containing polymers in the plurality of plastic polymers may be about 350 °C or less, about 340 °C or less, about 330 °C or less, about 320 °C or less, or about 310 °C or less. After dechlorination, the mixed plastic waste that leaves the first reactive screw extruder may have a chlorine content or concentration of less than 50 ppm, less than 40 ppm, less than 30 ppm, less than 25 ppm, less than 29 ppm, less than 10 ppm, or even less. Thus, the dechlorinated, mixed plastic waste may contain less than about 25 ppm chlorine, less than about 10 ppm chlorine, or even less than about 5 ppm.

The overall configuration of the first reactive screw extruder may vary. For example, in some embodiments, the first reactive screw extruder may be in the form of a single screw extruder or, in other embodiments, the first reactive screw extruder may be in the form of a twin screw extruder. However, it should be noted that other configurations may be possible as would be understood by a person having skill in the art. For example, given the wide range of screw and barrel designs, dimension, and process parameters, there are various screw profiles and process functions that may be implemented to achieve the desired process requirements and/or the desired degree of initial depolymerization.

In one or more embodiments, systems of the disclosure may optionally include a gas-liquid contactor 124 (e.g., as depicted in FIG. 1) connected to and in fluid communication with the first reactive screw extruder 102 via a gas outlet 126 thereof to mitigate gaseous hydrogen chloride that may be generated from the depolymerization of any chlorine-containing polymers, such as any polyvinyl chloride plastics in the mixed plastic waste. A vacuum may be applied to the first reactive screw extruder 102 to evacuate liberated gaseous hydrogen chloride to the gas-liquid contactor 124. In another embodiment, a nitrogen or other inert gas may be passed through the first reactive screw extruder 102 to sweep the gaseous hydrogen chloride to the gas-liquid contactor 124. As is known to those skilled in the art, polyvinyl chloride depolymerizes between about 285 °C to 300 °C to gaseous hydrogen chloride and a hydrocarbon polymer. In some embodiments, the gas-liquid contactor 124 can be designed to convert gaseous hydrogen chloride received from the gas outlet 126 of the first reactive screw extruder 102 to a non-volatile product that is recoverable from the gas-liquid contactor 124 via a gas-liquid contactor outlet 128. For example, the gas-liquid contactor can contain an aqueous base therein that is capable of reacting with the hydrogen chloride gas evolved from the first reactive screw extruder, thereby generating a recoverable non-volatile product, e.g., such as sodium chloride. The aqueous base may be added to the gas-liquid contactor via a spray inlet 130 in the gas-liquid contactor 124. However, in one or more embodiments, at least a portion of the aqueous base may be added directly to the first reactive screw extruder 102 via a base inlet 132 in addition, or as an alternative, to adding the aqueous base via the spray inlet 130 in the gas-liquid contactor 124. As noted above, the gaseous hydrogen chloride is evolved in the first reactive screw extruder from depolymerization of chlorine-containing polymers in the mixed plastic waste (e.g., depolymerization of PVC and other chlorine-containing polymers released hydrogen chloride gas which is undesirable). In one or more embodiments, a solid base (e.g., potassium hydroxide, sodium hydroxide, or a combination of both) may be added to the first reactive screw extruder 102 rather than an aqueous base described above. In certain embodiments, the solid base becomes a molten salt at less than 200 °C. The solid base reacts with the chlorine liberated through thermal decomposition of the chlorine-containing polymers to form either potassium chloride or sodium chloride.

In one or more embodiments, systems of the disclosure may include a first extrusion product stream 134 connected to and in fluid communication with the outlet 122 of the first reactive screw extruder 102 to receive an extrusion product therefrom. As shown in FIG. 1, the system includes a second reactive screw extruder 104 having an inlet 136 into which the dechlorinated, mixed plastic waste is supplied (e.g., via the first extrusion product stream 134) and an outlet 138 therefrom. The second reactive screw extruder 104 may be configured to heat the dechlorinated, mixed plastic waste to a temperature sufficient to cause initial depolymerization of a portion of the plurality of plastic polymers in the mixed plastic waste. "Depolymerization" generally refers to the process of converting a polymer, or plurality of polymers, into individual monomers or a mixture of monomers with such process being driven by entropy. For example, the tendency of individual polymers to depolymerize is indicated by their ceiling temperature; and above each polymers' individual ceiling temperature, the rate of depolymerization is greater than the rate of polymerization, which inhibits the formation of the given polymer. Therefore, the temperature sufficient to cause initial thermal depolymerization may vary, for example, based on the types of plastics/polymers in the mixed plastic waste feed. In some embodiments, for example, the temperature within the second reactive screw extruder may be sufficient to convert the plurality of polymers in the mixed plastic waste to an oligomeric species having a nominal molecular weight ranging from about 1,000 to about 20,000 Daltons, or about 5,000 to about 10,000 Daltons. In some embodiments, the temperature sufficient to cause initial depolymerization of the portion of plastic polymers may be between about 300 °C and about 450 °C, between about 325 °C to about 425 °C, or between about 350 °C to about 400 °C. In certain embodiments, the temperature sufficient to cause initial depolymerization of the portion of plastic polymers may be at least about 300 °C, at least about 350 °C, at least about 400 °C, or higher.

In addition to operating at elevated temperatures, the second reactive screw extruder 104 may be operated under non-atmospheric pressure. For example, the second reactive screw extruder may be operated at elevated pressures created at the second reactive screw extruder itself. In some embodiments, the pressure within the second reactive screw extruder may be between about 1 to about 100 bar, between about 20 to about 80 bar, or between about 40 to about 60 bar. In some embodiments, the pressure within the second reactive screw extruder may be at least about 1 bar, at least about 20 bar, at least about 40 bar, at least about 60 bar, at least about 80 bar, or higher. Conversely, the second reactive screw extruder may be operated under vacuum (e.g., pressures below atmospheric pressure). Under vacuum, the second reactive screw extruder may be operated at even more reduced temperatures than those described above, because the initial depolymerization of at least a portion of the plastic polymers occurs at lower temperatures in a reduced pressure environment.

The overall configuration of the second reactive screw extruder may vary. In some embodiments, the second reactive screw extruder 104 may be in the form of a single screw extruder or, in other embodiments, the second reactive screw extruder may be in the form of a twin screw extruder. However, it should be noted that other configurations may be possible as would be understood by those persons having skill in the art. For example, given the wide range of screw and barrel designs, dimension, and process parameters, there are various screw profiles and process functions that may be implemented to achieve the desired process requirements and/or the desired degree of initial depolymerization.

In some embodiments, one or more compounds may be introduced into the second reactive screw extruder 104, via a reactor inlet 140, along with the dechlorinated mixed plastic waste to facilitate depolymerization and/or to minimize free radical formation during the initial depolymerization of the plurality of plastic polymers in the mixed plastic waste feed, thereby reducing heavier hydrocarbon product formation and increasing naphtha yield downstream. In some embodiments, for example, a hydrogen donor solvent may be added to the second reactive screw extruder via the reactor inlet 140. A "hydrogen donor solvent" refers to any hydrocarbon solvent capable of transferring hydrogen to hydrogen-poor substrates. The use of a hydrogen donor solvent can be particularly beneficial in stabilizing free radicals formed during depolymerization and yielding a higher product conversion. For example, the addition of a hydrogen donor solvent in the second reactive screw extruder can cause transfer of hydrogen from the hydrogen donor solvent to free radical compounds created during the initial depolymerization of the plurality of plastic polymers in the mixed plastic waste.

Non-limiting examples of hydrogen donor solvents include sub- and super-critical water, alcohol, decalin, glycerol, and tetralin (e.g., 1,2,3,4-tetrahydronaphthalene). In some embodiments, the hydrogen donor solvent may include tetralin. The amount of the hydrogen donor solvent introduced into the second reactive screw extruder may vary. In some embodiments, the amount of hydrogen donor solvent may be range from about 1% to about 10% by weight, or about 2.5% to about 7.5% by weight, based on the total weight of the mixed plastic waste. In some embodiments, the amount of hydrogen donor solvent may be at least about 1%, at least about 2.5%, at least about 5%, or at least about 7.5% by weight, based on the total weight of the mixed plastic waste. The addition of tetralin to the second reactive screw extruder generates an increased pressure therein that may be as high as 550 psi. Therefore, the amount of tetralin added must be selected to ensure that the pressure within the second reactive screw extruder does not exceed design parameters.

In certain embodiments, hydrogen gas may be used, instead of a hydrogen donor solvent, to stabilize radical fragments of polymer that may be generated during the initial depolymerization. Like with hydrogen donor solvents, such stabilization of radical components with hydrogen gas reduces radical recombination and thereby produces a higher quality product, e.g., reduced olefins. In such embodiments, the hydrogen gas may be added to the second reactive screw extruder either via the reactor inlet 140 or separately via another inlet positioned in the second reactive screw extruder. In one or more embodiments, the hydrogen gas is fed to the second reactive screw extruder at an elevated pressure, such as a pressure above atmospheric pressure. In some embodiments, the hydrogen gas is fed to the second reactive screw extruder at a pressure ranging from about 500 to about 1000 psig.

In some embodiments, a transition metal catalyst may be added to the reactive screw extruder in addition to, or as an alternative to, a hydrogen donor solvent and/or hydrogen gas. The type of transition metal catalyst may vary. For example, in some embodiments, the transition metal catalyst may include molybdenum octoate or molybdenum naphthenate. The transition metal catalyst may be added directly to the second reactive screw extruder via the reactor inlet 140. However, in some embodiments, the transition metal catalyst may be added to the second reactive screw extruder separately, e.g., via another inlet positioned in the second reactive screw extruder. In some embodiments, the transition metal catalyst is added to the MPW feed in an amount ranging from about 100 to about 2,000 ppm metal, from about 500 to about 1,500 ppm, or from about 750 to about 1,250 ppm of the mixed plastic waste. In some embodiments, the transition metal catalyst may be added to the MPW feed in an amount of at least about 100 ppm, at least about 500 ppm, at least about 1,000 ppm, at least about 1,500 ppm, or more of the mixed plastic waste. The catalyst acts to lower the temperature at which the initial depolymerization of the mixed plastic waste occurs in the second reactive screw extruder.

In one or more embodiments, a sulfur-containing compound can be added along with the transition metal catalyst. In such embodiments, the sulfur-containing compound will sulfide the transition metal catalyst resulting in a desirable form of the transition metal catalyst. For example, in some embodiments where the catalyst is a molybdenum-based catalyst, the sulfur-containing compound will react with the molybdenum-based catalyst forming $MoS_2$ at a fairly low temperature. The type of sulfur-containing compound is not intended to be limiting and may include any sulfur-containing compound that would enhance catalyst activity, as such would be understood by one of skill in the art. In some embodiments, for example, the sulfur-containing compound is butyl sulfide. In such embodiments, the sulfur-containing compound may be added to the second reactive screw extruder either via the reactor inlet 138 or separately via another inlet positioned in the second reactive screw extruder.

In one or more embodiments, systems of the disclosure may include a second extrusion product stream 142 connected to and in fluid communication with the outlet 138 of the second reactive screw extruder 104 to receive a second extrusion product therefrom.

In some embodiments, the system may include a first separation unit 144 connected to and in fluid communication with the second extrusion product stream 142. In such embodiments the first separation unit 144 may be configured to separate a solids material from the second extrusion product, which is recovered via a solids outlet stream 146. The second extrusion product stream 142 may have a viscosity that is similar to that or slightly higher than water at the temperature of the stream. In one or more embodiments, a solvent may be added to the second extrusion product to lower the viscosity thereof prior to introduction into the first separation unit 144. The bales of mixed plastic waste 114 that are shredded in the shredder 110 may contain as much as ten percent non-plastic solid waste material. Thus, the first separation unit 144 is needed to separate out non-plastic solid material from the extraction product.

In one or more embodiments, systems may include a separated extrusion product stream 148 connected to and in fluid communication between an outlet of the first separation unit 144 and a first inlet of a junction 150 that enables flow of the separated extrusion product from the first separation unit 144 to the junction 150. In some embodiments, the junction 150 may also have a second inlet that receives a recycle stream 152 of a process solvent and a reaction catalyst (e.g., recycled process solvent, reaction catalyst, and fresh/make-up solvent and/or catalyst). The junction 150 is configured to combine and/or mix the separated extrusion product stream entering therein through the first inlet with the recycle stream 152 of the process solvent and the reaction catalyst entering through the second inlet to form or define a process feed stream 154.

The type of process solvent used may vary in accordance with the systems utilized. In some embodiments, the process solvent may include decant/slurry oil or some other recycled/waste stream from one or more FCC process within a refinery. In some embodiments, the process solvent may include one or more of a carbon black oil, a heavy cat cycle oil, a vacuum gas oil (which may be hydrotreated or unhydrotreated), or any hydrocarbon boiling in the range from about 300 °C to about 565 °C. For example, in some embodiments, the process solvent may be a mixture of carbon black oil, heavy cat cycle oil (slurry oil), and/or vacuum gas oil. In one embodiment, the process solvent is a mid-cut of heavy cat cycle oil that has a boiling point ranging from about 300 °C to about 565 °C. In some embodiments, the process solvent is a mid-cut carbon black oil that has a boiling point ranging from about 300 °C to about 565 °C. In still other embodiments, the process solvent is a vacuum oil that has a boiling point ranging from about 300 °C to about 565 °C. The mid-cut of the cat cycle oil, the carbon black oil, and/or the vacuum oil ensures that the process solvent is sufficiently heavy that it does not distill and separate with the desired naphtha blend stock but is also sufficiently light that it has a reduced asphaltene content and mitigates coke formation. In one or more embodiments, the heavy cat cycle oil used in the systems and methods disclosed herein is prepared by filtering the solids, mainly catalyst, from the carbon black oil that exits the FCC unit, taking the mid-cut of the heavy cat cycle oil (i.e., that portion that has a boiling point ranging from about 300 °C to about 565 °C, and then adding the filtered solids (i.e., catalyst) back to the mid-cut heavy cat cycle oil. It should be noted that the process solvent added to the mixed plastic waste typically contains a content of sulfur ranging of about 0.5 to about 1.5 wt % such that the process solvent may also donate hydrogen moieties when combined with the mixed plastic waste.

As noted herein, a reaction catalyst may be mixed with the separated extrusion product stream and the process solvent. In some embodiments, the reaction catalyst may already be present in the process solvent (e.g., in the form of spent FCC catalyst in the process solvent) and/or additional/fresh reaction catalyst may be added to the process solvent and the separated extrusion product stream 148. In some embodiments, the reaction catalyst may be a core-shell catalyst that has an active catalyst shell disposed on a non-porous core support. In certain embodiments, for example, the active catalyst shell may have a surface area of about 5 to about 50 $m^2/g$. In some embodiments, the reaction catalyst may include a solid acid catalyst such as silica-alumina cracking catalyst. In certain embodiments, the reaction catalyst may include a silica support that has a silica-alumina active catalyst layer of less than 10 nanometers thickness disposed thereon. In some embodiments, the reaction catalyst may be a sulfated zirconia catalyst or a calcium sulfate-supported trimetaphosphoric acid catalyst. In still other embodiments, the reaction catalyst may be a microporous cracking catalyst, such as ZSM-5, or other higher surface area microporous catalyst. In one or more embodiments, the ZSM-5 may be an equilibrium catalyst (ECAT) that includes nickel and vanadium. The ECAT may be obtained from an FCC unit or from a third party supplier at reduced cost over fresh ZSM-5 catalyst. It should be noted that the listed reaction catalysts are not intended to be limiting thereof and any reaction catalyst commonly used in catalytic cracking processes would be suitable for use in the methods and systems provided herein.

The amount of reaction catalyst present in the process feed stream may vary based on the amount of spent catalyst present in the process solvent and/or based on the amount of fresh catalyst or make-up process solvent that is added thereto. In some embodiments, for example, the reaction catalyst may be present in an amount of about 1% to about 10% by weight, about 2% to about 8% by weight, or about 4% to about 6% by weight, based on the total weight of the process feed stream. In some embodiments, the reaction catalyst may be present in an amount of at least about 2% by weight, at least about 4% by weight, at least about 6% by weight, at least about 8% by weight, or higher, based on the total weight of the mixed extrusion product.

As noted above, the system includes a multi-tray reactive distillation column 106 having a feed stream inlet 156 connected to and in fluid communication with the process feed stream 154 containing the separated mixed plastic waste, the process solvent, and the reaction catalyst. While only one feed stream inlet is shown in the embodiment depicted in FIG. 1, it should be noted that more than one feed stream inlet may be present. Thus, in some embodiments, the feed stream inlet 156 may be positioned proximate to a top portion of the multi-tray reactive distillation column and a second feed stream inlet (e.g., which is also connected to and in fluid communication with the process feed stream) may be positioned at an elevation below the feed stream inlet 156.

Distillation columns are commonly used in commercial refinery applications and in catalytic cracking processes. In such applications, a feed stream may be fed to a distillation column and separated fractions of the feed stream may be removed continuously therefrom via one or more output streams in the distillation column. In some applications, the liquid feed stream may be separated into separate fractions via selective evaporation and/or condensation to remove the output fractions from the column. While the arrangement and/or configuration of the multi-tray reactive distillation column may vary, a multi-tray reactive distillation column of one or more embodiments described herein may include a column (or tower) in the form of an outer metal shell containing two or more trays at different pressures and temperatures, and thus, each having a different vapor-liquid equilibrium. For example, the temperature and pressure within the multi-tray reactive distillation column are typically highest near the bottom of the column and lowest near the top of the column. The presence of the two or more trays within the multi-tray reactive distillation column allow for separation of different fractions of hydrocarbons therein based on their boiling points (e.g., heavy to lighter fractions from bottom to top of the column) such that the separated fractions can be cracked and removed individually, or in boiling point ranges, from the column through side draws/streams. Lighter hydrocarbon fractions (e.g., such as naphtha) may be removed in the upper portion of the column whereas heavier hydrocarbon fractions travel downward in the column where further cracking occurs to break down those heavier hydrocarbons into lighter molecular weight hydrocarbons. The number of trays within the multi-tray reactive distillation column may vary and may include at least 2 trays, at least 3 trays, at least 4 trays, at least 5 trays, at least 6 trays, at least 7 trays, at least 8 trays, or more. In certain embodiments, the number of trays within the multi-tray reactive distillation column may include at least 20 trays, at least 40 trays, at least 60 trays, at least 80 trays, at least 100 trays, or more.

In some embodiments, the multi-tray reactive distillation column 106 may be configured to provide countercurrent flow of the process feed stream 154 (i.e., including extrusion product, process solvent, and reaction catalyst) and the at least partially depolymerized plastic polymer vapors within the multi-tray reactive distillation column. For example, hot vapors generated from the catalytic cracking and depolymerization of the plurality of plastic polymers in the process feed stream 154 travel upwards in the multi-tray reactive distillation column while the process solvent, heavier uncracked plastic polymers, and reaction catalyst move downward through the column countercurrent to the upward hot vapor flow. As lighter hydrocarbon fractions are formed, they volatilize and pass upward though the multi-tray reactive distillation column as hot vapors. In some embodiments, lighter vapors rise through the multi-tray reactive distillation column and can be withdrawn on an upper or middle tray as a liquid stream that boils in the naphtha hydrocarbon range (e.g., $C_5$—225 °C), thereby eliminating the heavy tail characteristic of most pyrolysis oil streams. Beneficially, the use of countercurrent flow allows for heavier uncracked plastic polymers and hydrocarbon fractions boiling above the naphtha hydrocarbon range to move downward in the multi-tray reactive distillation column and react further with the reaction catalyst until they can be cracked and a portion thereof recovered as naphtha as described above. As disclosed above, the process solvent is selected to reduce the amount of process solvent that this carried upward through the column and into various product/blend stock side streams. However, depending on the process solvent used (e.g., vacuum gas oil), the process solvent itself can be at least partially distilled such that naphtha and other blend stocks/products are generated and separated out through the various side streams. Unreacted oligomers, process solvent, reaction catalyst, and char/coke is permitted to exit the bottom of the multi-tray reactive distillation column where these materials can be separated, recycled and re-introduced into the process, and/or sent to other processes. By providing countercurrent flow within the multi-tray reactive distillation column, a substantial depolymerization and enhanced naphtha yield (e.g., providing about 99.6% product yield as compared to about 0.4% coke produced) may be achieved.

In some embodiments, the multi-tray reactive distillation column may be operated under a vacuum to increase the volatilization of naphtha during the depolymerization of the mixed extrusion product. Thus, the multi-tray reactive distillation column may be operated at a pressure that is significantly less than atmospheric pressure (i.e., vacuum pressure). Operation of the multi-tray reactive distillation column under vacuum pressure can be particularly beneficial because it allows distillation/separation of compounds at a lower temperature than the temperature necessarily to distill/separate the same compounds at higher pressures. A lower operational temperature also facilitates greater separation of uncracked compounds. Typically, heavier hydrocarbons remain in the multi-tray reactive distillation column (i.e., are not drawn from the multi-tray reactive distillation column through side draws) due to the fact that they possess extremely high boiling points (e.g., temperatures of 750 °C or more), which cannot be cracked under typical atmospheric distillation units. Thus, operating the multi-tray reactive distillation column under a vacuum reduces the required temperature to boil these heavier fractions, thereby increasing the overall process yield.

In one or more embodiments, a stripping steam or a stripping hydrogen gas may also be injected into the multi-tray reactive distillation column proximate to a bottom end portion thereof. In such embodiments, the multi-tray reactive distillation column may include one or more stripping gas injection ports disposed proximate to a bottom portion thereof. In some embodiments, the injection of a stripping stream (e.g., composed of either steam or hydrogen gas) near the bottom portion of the multi-tray reactive distillation column can improve process yield because it lowers the partial pressure of the hydrocarbons within the plurality of plastic polymers, which allows for additional vaporization of heavier hydrocarbons therein. For example, introduction of a stripping stream near the bottom of the multi-tray reactive distillation column can further heat the flow of the plurality of plastic polymers in the process feed stream, thereby allowing lighter hydrocarbons to be recovered when such lighter hydrocarbons are converted to the vapor phase.

Typically, the multi-tray reactive distillation column includes a plurality of side streams or side draws connected thereto. As shown in FIG. 1, for example, a first side stream 158 may be arranged to draw naphtha from the multi-tray reactive distillation column 106. In other embodiments, the multi-tray reactive distillation column may include one or more additional side streams arranged to draw naphtha and/or other distillates from the multi-tray reactive distillation column. For example, the multi-tray reactive distillation column 106 may include a second side stream 160 arranged to draw naphtha or another distillate product stream from the multi-tray reactive distillation column. It should be noted that the exact arrangement of the plurality of side streams and/or their orientation in relation to the plurality of trays within the reactive distillation column may vary based on the desired product streams (e.g., based on boiling range), the composition of the mixed extrusion product feed stream, and/or the operating conditions of the reactive distillation column. Moreover, the throughput or capacity of the systems and methods disclosed herein may be scaled as desired by altering the dimensions of the multi-tray reactive distillation column 106.

As noted above, at least a portion of the plurality of plastic polymers in the mixed extrusion product may not react completely with the reaction catalyst initially (e.g., to achieve complete depolymerization and be recovered as naphtha or some other desired distillate) and such unreacted polymers can be recovered via a bottoms stream and recycled within the system. As shown in FIG. 1, the system 100 may include a bottoms stream 162 connected to and in fluid communication with the multi-tray reactive distillation column 106 proximate to a bottom portion thereof. In some embodiments, the bottoms stream 162 may be configured to receive a flow from the multi-tray reactive distillation column that includes the process solvent and/or unreacted plastic polymers and/or reaction catalyst and/or char/coke which has formed on the catalyst. In some embodiments, the bottoms stream 162 may optionally include a second junction 164 that directs at least a portion of a flow of the bottoms stream 162 to one or more additional components (e.g., such as a reboiler and/or a separation unit).

As shown in FIG. 1, the system 100 may optionally include a reboiler 166 connected to and in fluid communication with the second junction 164 via a first flow of the bottoms stream 168. In such embodiments, the reboiler 166 can be configured to vaporize at least a portion of the first flow of the bottoms stream 168 to produce a vapor that is reinjected onto a lower tray of the multi-tray reactive distillation column 106 via an inlet side stream 170 positioned proximate to the bottom of the multi-tray reactive distillation column 106. It should be noted that reinjection of a heated vapor from the reboiler can be beneficial to provide additional heat near the base of the multi-tray reactive distillation column which can assist in further depolymerization of unreacted plastic polymers and lead to a more efficient process. Generally, the type of reboiler used in the systems described herein may vary as would be understood by a person skilled in the art. In one or more embodiments, the type of reboiler may vary based on the characteristics (e.g., density, boiling point, etc.) of the first flow of the bottoms stream flowing into the reboiler. In some embodiments, for example, the reboiler may be a fired reboiler/heater that acts as a heat exchanger. In such embodiments, the fired reboiler may include a pump that circulates the first flow of the bottoms through heat transfer tubes in the reboiler to vaporize the first flow of the bottoms stream that is then reinjected into the multi-tray reactive distillation column. Other non-limiting examples of reboilers useful in the systems described herein include, but are not limited to, kettle-type reboilers, forced circulation reboilers, thermosiphon reboilers, and the like.

In some embodiments, the system 100 may also include a condenser 172 connected to and in fluid communication with the multi-tray reactive distillation column 106 via a condenser inlet 174 positioned proximate to a top portion of the multi-tray reactive distillation column 106. Typically, the condenser 174 can be configured to remove heat from the multi-tray reactive distillation column 106 via condensation and, in particular, can be useful in removing additional heat introduced into the system via the reboiler 166. For example, heated vapors entering the condenser are converted to a liquid in the condenser and latent heat is thereby removed from the multi-tray reactive distillation column. In addition to removing excess heat from the multi-tray reactive distillation column, the condenser may also recover light ends (e.g., lighter hydrocarbon vapors having a boiling point lower than the naphtha hydrocarbon range such that these lighter hydrocarbon vapors can be recovered as a condensed liquid stream exiting the condenser) via a first condenser outlet stream 176. In some embodiments, the system may include a second condenser outlet stream 178 connected to the condenser that is configured to recover even lighter ends (e.g., having a boiling point even lower than the light end hydrocarbon vapors recovered in the first condenser outlet stream 176). Likewise, cooled liquid that is not recovered may be reintroduced into the multi-tray reactive distillation column to regulate heat within the column via a condenser inlet side stream 180 positioned proximate to the top portion of the multi-tray reactive distillation column 106. Generally, the type of condenser used in the systems described herein may vary as would be understood by a person skilled in the art. For example, non-limiting examples of condenser suitable for use with the systems disclosed herein may include, but are not limited to, air-cooled condensers, water-cooled condensers, evaporative condensers, indirect contact condensers, direct contact condensers, double tube condensers, shell and coil condensers, shell and tube condensers, and the like.

In one or more embodiments, the system may optionally include a second separation unit 182. As depicted in FIG. 1, the system includes a second separation unit 182 that is connected to and in fluid communication with the second junction 164 via a second flow of the bottoms stream 184, such that the separation unit separates from the bottoms stream the reaction catalyst and at least a portion of the coke generated within the distillation column. The coke and reaction catalyst recovered from the second flow of the bottoms stream 184 may be removed from the second separation unit 182 via an outlet 188 therein. The remaining portion of the reaction of the second flow of the bottom stream (i.e., that is not separated out by the second separation unit 182) becomes a recycle stream 152 that is connected to and in fluid communication between the second separation unit 182 and the junction 150. At least a portion of the reaction catalyst separated out by the second separation unit 282 may be further separated from the coke and reintroduced into the recycle stream 252 for reuse. The type of separation unit may vary based on the desired degree of separation and/or based on certain process parameters as would be understood by a person of skill in the art. In one or more embodiments, the separation unit may include, but is not limited to, at least one of a ceramic filter, a metal filter, a centrifuge, and a settling tank.

In some embodiments, the system may also include a third flow of the bottoms stream 152 that is connected to and in fluid communication with the second junction 164 connected to the bottoms stream 162. As depicted in FIG. 1, the system 100 includes a third flow of the bottoms stream 190 connected to and in fluid communication with the second junction 164 that is combined with the recycle stream 152 to return at least a portion of the process solvent and unreacted plastic polymers in the bottoms stream to the separated extrusion product stream 148 via the first junction 150.

In one or more embodiments, the system may also include a make-up stream that provides additional process solvent and/or reaction catalyst to the recycled stream and the third flow of the bottoms stream. As shown in FIG. 1, the system includes a make-up stream 192 connected to and in fluid communication with the recycle stream 152 and the third flow of the bottoms stream 190 to introduce make-up process solvent and make-up reaction catalyst therein as desired. In such embodiments, the make-up stream 192, the recycle stream 152, and the third flow of the bottoms stream 190 may all be in fluid communication with the first junction 150 to deliver process solvent, reaction catalyst, and unreacted plastic polymers to the separated extrusion product stream 148. It should be noted that the make-up stream may be designed to provide fresh process solvent and catalyst and/or it may be designed to provide used process solvent or catalyst that may have been recovered from one or more process within the refinery (e.g., slurry oil containing spent FCC catalyst from an FCC unit). In one or more embodiments, the make-up process solvent and/or reaction catalyst may include any process solvent or reaction catalyst discussed herein. In at least some embodiments, one or more of the make-up stream 192, the recycle stream 152 and/or the third flow of the bottoms stream 190 may be passed through a hydrotreater (not shown) positioned upstream of the first junction 150 in order to hydrogenate the hydrocarbons in these streams. Such hydrogenation may enhance the stabilizing effect of the process solvent with respect to any radicals that may be present in the separated extrusion product stream 148 upon mixing at the first junction 150.

Also disclosed herein are additional embodiments of systems and methods for processing mixed plastic waste, which may incorporate one or more pieces of equipment described herein above and one or more additional pieces of equipment. FIG. 2 depicts an additional embodiment of a system for processing mixed plastic waste that includes a first reactive screw extruder 202, a second reactive screw extruder 204, and a multi-tray reactive distillation column 206. A mixed plastic waste feed is supplied to the first reactive screw extruder 202 via an inlet 208 therein. The mixed plastic waste feed includes a plurality of different plastics, each composed of plastic polymers, as described above with respect to the embodiment illustrated in FIG. 1.

Now turning to FIG. 2, in one or more embodiments, systems may include a shredder 220 positioned upstream of the first reactive screw extruder 202. For example, as depicted in FIG. 2, the shredder 210 may include an inlet 212 positioned to receive bales of raw mixed plastic waste 214 (or loose raw mixed plastic waste) and an outlet 216 that feeds a shredded mixed plastic waste 218 via a conveyer 220 to the inlet 208 of the first reactive screw extruder 202. The overall type or configuration of the shredder may vary as described herein above with respect to the embodiment depicted in FIG. 1. Referring back to FIG. 2, in some embodiments, the outlet 216 of the shredder may be connected to one or more additional components capable of transporting the shredded mixed plastic waste feed 218 from the outlet 216 of the shredder to the inlet 208 of the first reactive screw extruder 202. As depicted in FIG. 2, for example, the system may include a conveyor belt 220 positioned to receive the shredded mixed plastic waste feed 218 and transfer the shredded mixed plastic waste feed 218 to the inlet 208 of the first reactive screw extruder 202. While a conveyor belt is shown in the embodiment depicted in FIG. 2, this is not intended to be limiting and the particular equipment used to transfer the shredded mixed plastic waste from the outlet of the shredder to the first reactive screw extruder may vary. For example, any suitable conveying technology could be used in place of the conveyor belt depicted in FIG. 2 including, but not limited to, a rotary conveyor, an oscillating conveyor, one or more vibrating screens, a chute, a funnel, and/or any other loading or conveying system commonly used in the art.

As shown in FIG. 2, some embodiments include a first reactive screw extruder 202 having an inlet 208 positioned to receive a mixed plastic waste feed (e.g., such as the shredded mixed plastic waste feed 218) that includes a plurality of different plastics, each composed of plastic polymers, and an outlet 222 thereof. The first reactive screw extruder 202 may be configured to heat the mixed plastic waste feed to a temperature sufficient to cause initial dechlorination of any chlorine-containing polymers in the plurality of plastic polymers in the mixed plastic waste feed. Removal of the chlorine is needed to mitigate the formation of chlorine radicals that attack organic materials and form organochlorides, which can be highly corrosive to downstream equipment. The overall configuration of the first reactive screw extruder and the process conditions (e.g., temperature, pressure, etc.) used therein are similar to those described above with respect to the first reactive screw extruder in FIG. 1.

In one or more embodiments, systems may optionally include a gas-liquid contactor 224 (e.g., as depicted in FIG. 2) connected to and in fluid communication with the first reactive screw extruder 202 via a gas outlet 226 thereof to mitigate gaseous hydrogen chloride that may be generated from the depolymerization of any polyvinyl chloride or other chlorine-containing plastics in the mixed plastic waste. In some embodiments, the gas-liquid contactor 224 can be designed to convert gaseous hydrogen chloride received from the gas outlet 226 of the first reactive screw extruder 202 to a non-volatile product that is recoverable from the gas-liquid contactor 224 via a gas-liquid contactor outlet 228. For example, the gas-liquid contactor can contain an aqueous base therein that is capable of reacting with the hydrogen chloride gas evolved from the first reactive screw extruder, thereby generating a recoverable non-volatile product, e.g., such as sodium chloride. Typically, the aqueous base is added to the gas-liquid contactor 224 via a spray inlet 230 in the gas-liquid contactor 224. However, in one or more embodiments, at least a portion of the aqueous base can be added directly to the first reactive screw extruder 202 via a base inlet 232 in addition, or as an alternative, to adding the aqueous base via the spray inlet 230 in the gas-liquid contactor 224. As noted above, the gaseous hydrogen chloride is evolved in the first reactive screw extruder from depolymerization of chlorine-containing polymers in the mixed plastic waste. (e.g., depolymerization of PVC and other chlorine-containing polymers released hydrogen chloride gas which is undesirable). In one or more embodiments, a solid base (e.g., potassium hydroxide, sodium hydroxide, or a combination of both) may be added to the first reactive screw extruder 202 rather than an aqueous base described above. The solid base becomes a molten salt at less than 200 °C but reacts with the chlorine liberated through thermal decomposition of the chlorine-containing polymers to form either potassium chloride or sodium chloride.

In one or more embodiments, the system may include a first extrusion product stream 234 connected to and in fluid communication with the outlet 222 of the first reactive screw extruder 202 to receive an extrusion product therefrom. As shown in FIG. 2, the system includes a second reactive screw extruder 204 having an inlet 236 into which the dechlorinated, mixed plastic waste is supplied (e.g., via the first extrusion product stream 234) and an outlet 238 therefrom. The second reactive screw extruder 204 may be configured to heat the dechlorinated, mixed plastic waste to a temperature sufficient to cause initial depolymerization of a portion of the plurality of plastic polymers in the mixed plastic waste. The overall configuration of the second reactive screw extruder and the process conditions (e.g., temperature, pressure, etc.) used therein are similar to those described above with respect to the second reactive screw extruder in FIG. 1.

In some embodiments, one or more compounds may be introduced into the second reactive screw extruder 204, via a reactor inlet 240, along with the dechlorinated, mixed plastic waste to facilitate depolymerization and/or to minimize free radical formation during the initial depolymerization of the plurality of plastic polymers in the mixed plastic waste feed, thereby reducing heavier hydrocarbon product formation and increasing naphtha yield downstream. For example, any compounds used in the initial depolymerization step involving the second reactive screw extruder of FIG. 1 would be suitable for use in the second reactive screw extruder of FIG. 2. Such compounds include, but are not limited to, hydrogen donor solvents, hydrogen gas, transition metal catalysts, sulfur-containing compounds, and combinations thereof.

As depicted in FIG. 2, the system may include a second extrusion product stream 242 connected to and in fluid communication with the outlet 238 of the second reactive screw extruder 204 to receive a second extrusion product therefrom. The second extrusion product stream 242 may have a viscosity that is similar to that or slightly higher than water. In one or more embodiments, a solvent may be added to the second extrusion product to lower the viscosity thereof prior to introduction into the first separation unit 244.

As noted, the system may include a first separation unit 244 connected to and in fluid communication with the second extrusion product stream 242. In such embodiments, the first separation unit 244 may be configured to separate a solids material from the second extrusion product which is recovered via a solids outlet stream 246. As previously described, the bales of mixed plastic waste 214 that are shredded in the shredder 210 may contain as much as ten percent non-plastic solid waste material. Thus, the first separation unit 244 is needed to separate out non-plastic solid material from the extraction product.

In one or more embodiments, systems of the disclosure may include a separated extrusion product stream 248 connected to and in fluid communication between an outlet of the first separation unit 244 and a first inlet of a junction 250 that enables flow of the separated extrusion product from the first separation unit 244 to the junction 250. In some embodiments, the junction 250 may also have a second inlet that receives a recycle stream 252 of a process solvent and a reaction catalyst (e.g., recycled process solvent, reaction catalyst, and fresh/make-up solvent and/or catalyst). The junction 250 is configured to combine and/or mix the separated extrusion product stream entering therein through the second inlet to form or define a process feed stream 254. The process solvent and the reaction catalyst used are similar to those described above with respect to the embodiment illustrated in FIG. 1.

As shown in FIG. 2, in one or more embodiments, systems may include a plug flow reactor 255 positioned between the first separation unit 244 and the multi-tray reactive distillation column 206. The plug flow reactor 255 has a reactor inlet 257 connected to and in fluid communication with the process feed stream 254 and also has a reactor outlet 259. While only one feed stream is shown in the embodiment depicted in FIG. 2, it should be noted that more than one feed stream may be present. The plug flow reactor 255 may be configured to heat the process feed stream to a temperature sufficient to cause further depolymerization of another portion of the plurality of plastic polymers in the mixed plastic waste. The temperature sufficient to cause further thermal depolymerization may vary, for example, based on the types of plastics/polymers in the process feed stream. In some embodiments, for example, the temperature within the plug flow reactor may be sufficient to convert the plurality of polymers in the mixed plastic waste to an oligomeric species having a nominal molecular weight ranging from about 1,000 to about 20,000 Daltons, or about 5,000 to about 10,000 Daltons. In some embodiments, the plug flow reactor may be operated at elevated temperatures and/or may be operated under non-atmospheric pressure. The amount of depolymerization achieved within the plug flow reactor is directly correlated to the residence time of the process feed stream within the plug flow reactor. In some embodiments, the residence time may be between about 10 minutes to about 2 hours, or about 30 minutes to about 1 hour. In some embodiments, the residence time within the plug flow reactor is at least about 10 minutes, at least about 20 minutes, at least about 30 minutes, at least about 40 minutes, or at least about 1 hour. In an embodiment, the residence time of the process feed stream within the plug flow reactor is about 30 minutes at a temperature ranging from 425 °C to 450 °C.

The overall configuration of the plug flow reactor may vary. For example, in some embodiments, the plug flow reactor may be in the form of a tubular plug flow reactor. In other embodiments, the reactor designated as the plug flow reactor may not be an actual plug flow reactor but another reactor type, such as a continuous tubular reactor (CTR), a continuously stirred tank reactor (CSTR), and the like. However, it should be noted that other configurations may be possible as would be understood by a person having skill in the art. For example, given the wide range of plug flow and other reactor designs, dimensions, and process parameters, there are various reactor profiles and process functions that may be implemented to achieve the desired process requirements and/or the desired degree of depolymerization.

As noted above, the system includes a multi-tray reactive distillation column 206 having a feed stream inlet 256 connected to and in fluid communication with the reactor outlet 259 to receive a reactor product outlet stream 263 therefrom. In embodiments in which the plug flow reactor 255 is absent, by-passed, or otherwise not implemented, the process feed stream 254 connects to and is fluid communication with the feed stream inlet 256. While only one feed stream inlet is shown in the embodiment depicted in FIG. 1, it should be noted that more than one feed stream inlet may be present. Thus, in some embodiments, the feed stream inlet 256 may be positioned proximate to a top portion of the multi-tray reactive distillation column and another feed stream inlet (e.g., which is also connected to and in fluid communication with the reactor product outlet stream) may be positioned at an elevation below the feed stream inlet 256. Generally, the arrangement and/or configuration of the multi-tray reactive distillation column may vary. Typically, a multi-tray reactive distillation column of one or more embodiments described herein may include a column (or tower) in the form of an outer metal shell containing two or more trays at different pressures and temperatures, and thus, each having a different vapor-liquid equilibrium. For example, the temperature and pressure within the multi-tray reactive distillation column are typically highest near the bottom of the column and lowest near the top of the column. The presence of the two or more trays within the multi-tray reactive distillation column allow for separation of different fractions of hydrocarbons therein based on their boiling points (e.g., heavy to lighter fractions from bottom to top of the column) such that the separated fractions can be cracked and removed individually, or in boiling point ranges, from the column through side draws/streams. Lighter hydrocarbon fractions (e.g., such as naphtha) may be removed in the upper portion of the column whereas heavier hydrocarbon fractions travel downward in the column where further cracking occurs to break down those heavier hydrocarbons into lighter molecular weight hydrocarbons. The number of trays within the multi-tray reactive distillation column may vary and may include at least 2 trays, at least 3 trays, at least 4 trays, at least 5 trays, at least 6 trays, at least 7 trays, at least 8 trays, or more. In certain embodiments, the number of trays within the multi-tray reactive distillation column may include at least 20 trays, at least 40 trays, at least 60 trays, at least 80 trays, at least 100 trays, or more. Without intending to be bound by theory, it should be noted that the use of the plug flow reactor in the embodiment depicted in FIG. 2 can advantageously reduce the required size of the multi-tray distillation column and/or the amount of time required for operation of the multi-tray reactive distillation column. For example, as the plug flow reactor provides a certain amount of further depolymerization of the plurality of plastic polymers in the mixed plastic waste, less depolymerization is necessary in the multi-tray reactive distillation column to recover the desired products (e.g., such as naphtha).

As described herein above, the multi-tray reactive distillation column 206 is typically configured to provide countercurrent flow of the reactor product outlet stream 263 (i.e., including the separated extrusion product, the process solvent, and the reaction catalyst) and the at least partially depolymerized plastic polymer vapors within the multi-tray reactive distillation column. In embodiments in which the plug flow reactor 255 is not present, the multi-tray reactive distillation column 206 is configured to provide countercurrent flow of the process feed stream 254. Hot vapors generated from the catalytic cracking and depolymerization of the plurality of plastic polymers in the reactor product outlet stream 263 (or process feed stream 254) travel upwards in the multi-tray reactive distillation column while the process solvent, heavier uncracked plastic polymers, and reaction catalyst move downward through the column countercurrent to the upward hot vapor flow. As lighter hydrocarbon fractions are formed, they volatilize and pass upward though the multi-tray reactive distillation column as hot vapors. In some embodiments, lighter vapors rise through the multi-tray reactive distillation column and can be withdrawn on an upper or middle tray as a liquid stream that boils in the naphtha hydrocarbon range (e.g., $C_5$—225 °C), thereby eliminating the heavy tail characteristic of most pyrolysis oil streams. Beneficially, the use of countercurrent flow allows for heavier uncracked plastic polymers and hydrocarbon fractions boiling above the naphtha hydrocarbon range to move downward in the multi-tray reactive distillation column and react further with the reaction catalyst until they can be cracked and a portion thereof recovered as naphtha as described above. As disclosed above, the process solvent is selected to reduce the amount of process solvent that this carried upward through the column and into various product/blend stock side streams. However, depending on the process solvent used (e.g., vacuum gas oil), the process solvent itself can be at least partially distilled such that naphtha and other blend stocks/products are generated and separated out through the various side streams. Unreacted oligomers, process solvent, reaction catalyst, and char/coke is permitted to exit the bottom of the multi-tray reactive distillation column where these materials can be separated, recycled and re-introduced into the process, and/or sent to other processes. By providing countercurrent flow within the multi-tray reactive distillation column, a substantial depolymerization and enhanced naphtha yield (e.g., providing about 99.6% product yield as compared to about 0.4% coke produced) may be achieved.

Typically, the multi-tray reactive distillation column includes a plurality of side streams or side draws connected thereto. As shown in FIG. 2, for example, a first side stream 258 may be arranged to draw naphtha from the multi-tray reactive distillation column 206. In other embodiments, the multi-tray reactive distillation column may include one or more additional side streams arranged to draw naphtha and/or other distillates from the multi-tray reactive distillation column. For example, the multi-tray reactive distillation column 206 may include a second side stream 260 arranged to draw naphtha or another distillate product stream from the multi-tray reactive distillation column. It should be noted that the exact arrangement of the plurality of side streams and/or their orientation in relation to the plurality of trays within the reactive distillation column may vary based on the desired product streams (e.g., based on boiling range), the composition of the mixed extrusion product feed stream, and/or the operating conditions of the reactive distillation column. Moreover, the throughput or capacity of the systems and methods disclosed herein may be scaled as desired by altering the diameter of the multi-tray reactive distillation column 206.

As noted above, a portion of the plurality of plastic polymers passing into the feed stream inlet 256 of the multi-tray reactive distillation column 206 (i.e. via the reactor product outlet stream 263 if a plug flow reactor 255 is present or via the process feed stream 254 if the plug flow reactor is absent) may not react completely with the reaction catalyst in the column 206 at least in a first pass (e.g., to achieve complete depolymerization and be recovered as naphtha or some other desired distillate). The unreacted polymers may be recovered via a bottoms stream 262 and recycled within the system. As shown in FIG. 2, the system 200 includes a bottoms stream 262 connected to and in fluid communication with the multi-tray reactive distillation column 206 proximate to a bottom portion thereof. In some embodiments, the bottoms stream 262 may be configured to receive a flow from the multi-tray reactive distillation column that includes the process solvent and/or unreacted plastic polymers and/or reaction catalyst and/or char/coke, which has formed on the catalyst. In some embodiments, the bottoms stream 262 may optionally include a second junction 264 that directs at least a portion of a flow of the bottoms stream 262 to one or more additional components (e.g., such as the plug flow reactor 255 and/or a second separation unit 282).

As shown in FIG. 2, in some embodiments, the system 200 may include a pump 275 and a heat exchanger 277 positioned between the multi-tray reactive distillation column and the second junction 264 and in fluid communication with the bottoms stream 262. In such embodiments, the pump 275 can be configured to pump the bottoms stream 262 to the heat exchanger 277. The type and capacity of the pump may vary based on the desired operational capacity of the multi-tray reactive distillation column. It should be noted that use of the heat exchanger can function to heat the bottoms stream 262 that is later combined with the process feed stream 254 at the second junction 264 prior to being fed to the plug flow reactor 255. Such a configuration can be beneficial to provide additional heat to the process feed stream being fed to the plug flow reactor, which can assist in further depolymerization of unreacted plastic polymers and lead to a more efficient process. Generally, the type of heat exchanger used in the systems described herein may vary as would be understood by a person skilled in the art. In one or more embodiments, the type of heat exchanger may vary based on the characteristics (e.g., density, boiling point, etc.) of the bottoms stream flowing into the heat exchanger. As shown in FIG. 2, for example, the heat exchanger 277 is connected to a pump 275, which can circulate the bottoms stream through heat transfer tubes in the heat exchanger to heat the bottoms stream that is then combined with the process feed stream and fed to the plug flow reactor 255.

In some embodiments, the system 200 may also include a condenser 272 connected to and in fluid communication with the multi-tray reactive distillation column 206 via a condenser inlet 274 positioned proximate to a top portion of the multi-tray reactive distillation column 206. Typically, the condenser 272 can be configured to remove heat from the multi-tray reactive distillation column 274 via condensation. For example, heated vapors entering the condenser are converted to a liquid in the condenser and latent heat is thereby removed from the multi-tray reactive distillation column. In addition to removing excess heat from the multi-tray distillation column, the condenser may also recover light ends (e.g., lighter hydrocarbon vapors having a boiling point lower than the naphtha hydrocarbon range such that these lighter hydrocarbon vapors can be recovered as a condensed liquid stream exiting the condenser) via a first condenser outlet stream 276. In some embodiments, the system may include a second condenser outlet stream 278 connected to the condenser 272 that is configured to recover even lighter ends (e.g., having a boiling point even lower than the light end hydrocarbon vapors recovered in the first condenser outlet stream 276). Likewise, cooled liquid that is not recovered may be reintroduced into the multi-tray reactive distillation column to regulate heat within the column via a condenser inlet side stream 280 positioned proximate to the top portion of the multi-tray reactive distillation column 206. Generally, the type of condenser used in the systems described herein may vary as would be understood by a person skilled in the art and as described herein above with respect to FIG. 1.

In one or more embodiments, the system may optionally include a second separation unit 282. As depicted in FIG. 2, the system includes a second separation unit 282 that is connected to and in fluid communication with the second junction 264 via a second flow of the bottoms stream 284, such that the second separation unit separates from the second flow of the bottoms stream the reaction catalyst and at least a portion of the coke generated within the multi-tray reactive distillation column. The coke and reaction catalyst recovered from the second flow of the bottoms stream 284 may be removed from the second separation unit 282 via an outlet 288 therein. The remaining portion of the second flow of the bottoms stream (i.e., that is not separated out by the second separation unit 282) becomes a recycle stream 252 that is connected to and in fluid communication between the second separation unit 282 and the first junction 250. At least a portion of the reaction catalyst separated out by the second separation unit 282 may be further separated from the coke and reintroduced into the recycle stream 252 for reuse. The type of separation unit may vary based on the desired degree of separation and/or based on certain process parameters as would be understood by a person of skill in the art and as described herein above.

In one or more embodiments, the system may also include a make-up stream that provides additional process solvent and/or reaction catalyst to the recycled stream. As shown in FIG. 2, the system includes a make-up stream 292 connected to and in fluid communication with the recycle stream 252 to introduce make-up process solvent and make-up reaction catalyst therein as desired. In such embodiments, the make-up stream 292 and the recycle stream 252 are combined to deliver process solvent, reaction catalyst, and unreacted plastic polymers to the separated extrusion product stream 248 via the first junction 250. It should be noted that the make-up stream may be designed to provide fresh process solvent and catalyst and/or it may be designed to provide used process solvent or catalyst that may have been recovered from one or more process within the refinery (e.g., slurry oil containing spent FCC catalyst from an FCC unit).

In one or more embodiments, the make-up process solvent and/or reaction catalyst may include any process solvent or reaction catalyst discussed herein.

As noted above, some embodiments provide methods of processing mixed plastic waste, which include converting the mixed plastic waste into pyrolysis oil and catalytically cracking the pyrolysis oil to recover a naphtha blend stock and/or other products therefrom. In one or more embodiments, such methods include introducing the mixed plastic waste (e.g., the mixed plastic waste including a plurality of plastic polymers) into a first reactive extrusion vessel maintained at an elevated temperature sufficient to cause initial dechlorination of chlorine-containing plastic polymers contained therein. As noted herein, the first reactive extrusion vessel may be in the form of a reactive screw extruder (e.g., such as a single screw extruder or a twin screw extruder). However, other types of extrusion vessels are possible as would be understood by a person of skill in the art or as otherwise described herein above. In some embodiments, the first reactive extrusion vessel may operate at a temperature sufficient to cause initial dechlorination of the plurality of plastic polymers in the mixed plastic waste. For example, in some embodiments, the temperature sufficient to cause an initial dechlorination of the portion of plastic polymers may range from about 300 °C and about 350 °C, about 310 °C to about 340 °C, or about 320 °C to about 330 °C. In certain embodiments, the temperature sufficient to cause an initial depolymerization of the portion of plastic polymers may be about 350 °C or less, about 340 °C or less, about 330 °C or less, about 320 °C or less, or about 310 °C or less.

In some embodiments, the methods disclosed herein may provide an additional step for breaking down bales of (or individual quantities of) raw mixed plastic waste into smaller more manageable sizes. For example, in one or more embodiments, such methods may optionally include feeding bales of (or quantities of) raw mixed plastic waste to a shredder prior to introducing the mixed plastic waste into the first reactive extrusion vessel. In such embodiments, the shredder may be positioned to shred the raw mixed plastic waste to provide a shredded mixed plastic waste. As noted herein, the shredded mixed plastic waste may have an average length/diameter of about 100 mm or less, about 50 mm or less, about 10 mm or less, about 5 mm or less, about 4 mm or less, or about 2 mm or less.

In one or more embodiments, hydrogen chloride gas evolved from the initial dechlorination of any chlorine-containing polymers in the mixed plastic waste may be fed to a gas-liquid contactor having an aqueous base contained therein prior to passing the dechlorinated, mixed plastic waste to the second reactive extrusion vessel. In such embodiments, the hydrogen chloride gas may be reacted with the aqueous base in the gas-liquid contactor to produce a non-volatile product (e.g., such as NaCl). The particular configuration of the gas-liquid contactor and/or the type of base contained therein may vary as described herein above and as would be understood by a person skilled in the art. As noted herein, in some embodiments of methods, at least a portion of the aqueous base may be added directly to the first reactive extrusion vessel to react with the hydrogen chloride gas generated during the initial dechlorination of the plurality of plastic polymers in the mixed plastic waste.

In one or more embodiments, the disclosed methods include introducing the dechlorinated, mixed plastic waste from the first reactive screw extrusion vessel (e.g., including a plurality of plastic polymers therein) into a second reactive extrusion vessel maintained at an elevated temperature sufficient to break down higher molecular weight polymers therein. As noted herein, the second reactive extrusion vessel may be in the form of a reactive screw extruder (e.g., such as a single screw extruder or a twin screw extruder). However, other types of extrusion vessels are possible as would be understood by a person of skill in the art or as otherwise described herein above. In some embodiments, the second reactive extrusion vessel may operate at a temperature sufficient to cause initial depolymerization of a portion of the plurality of plastic polymers in the mixed plastic waste. For example, as noted herein above, the temperature within the second reactive screw extruder may be sufficient to convert at least a plurality of polymers in the mixed plastic waste to an oligomeric species having a nominal molecular weight ranging from about 1,000 to about 20,000 Daltons, or about 5,000 to about 10,000 Daltons. In some embodiments, the temperature sufficient to cause an initial depolymerization of the portion of plastic polymers may be between about 400 °C and about 450 °C, about 410 °C to about 440 °C, or about 420 °C to about 430 °C. In certain embodiments, the temperature sufficient to cause an initial depolymerization of the portion of plastic polymers may be at least about 400 °C, at least about 420 °C, at least about 440 °C, or higher.

In certain embodiments, the methods may include introducing one or more compounds into the second reactive extrusion vessel in addition to the dechlorinated, mixed plastic waste in order to facilitate depolymerization of the dechlorinated, mixed plastic waste and to improve naphtha yield during the process. In some embodiments, a hydrogen donor solvent may be added to the second reactive extrusion vessel (e.g., including the mixed plastic waste therein) causing a transfer of hydrogen from the hydrogen donor solvent to free radical compounds created during the initial depolymerization of the plurality of plastic polymers in the mixed plastic waste. The hydrogen addition to the free radical compounds mitigates reduces heavier hydrocarbon product formation and increases naphtha yield. It should be understood that the particular hydrogen donor solvent is not meant to be limiting and any hydrogen donor solvent discussed herein above would be suitable for use in the disclosed methods. In other embodiments, gaseous hydrogen, a transition metal catalyst, and a sulfur-containing compound may be added to the second reactive extrusion vessel to cause a transfer of hydrogen from the gaseous hydrogen to free radical compounds created during the initial depolymerization of the plurality of plastic polymers in the mixed plastic waste. The hydrogen addition reduces heavier hydrocarbon product formation and increases naphtha yield. The particular transition metal catalyst and/or sulfur-containing compound may vary. In some embodiments, for example, the transition metal catalyst may include molybdenum octoate or molybdenum napthenate, and the sulfur-containing compound may include butyl sulfide. However, it should be understood that the particular transition metal catalyst and/or sulfur-containing compound are not meant to be limiting and any transition metal catalyst and/or sulfur-containing compound as discussed herein above is intended to be suitable for use in the disclosed methods.

After an initial depolymerization, the extrusion product exiting the second reactive extrusion vessel (e.g., partially depolymerized plastic polymers) is mixed with a high boiling point solvent and a reaction catalyst and the combined mixture is fed to a multi-tray reactive distillation column where the partially depolymerized product undergoes further depolymerization in the presence of the reaction catalyst. The particular process solvent and/or reaction catalyst may vary and it is understood that any process solvent and/or reaction catalyst described herein above with respect to the systems of the present disclosure may be suitable for use in these methods. In some embodiments, the process solvent may include one or more of a carbon black oil, a heavy cat cycle oil, a vacuum gas oil or any hydrocarbon stream boiling in the range from about 300 °C to about 565 °C. In some embodiments, the reaction catalyst may be a silica alumina cracking catalyst and/or any other reaction catalyst as described herein. Moreover, the reaction catalyst may be present in an amount of about 1% to about 10% by weight, about 2% to about 8% by weight, or about 4% to about 6% by weight, based on the total weight of the process feed stream. In some embodiments, the reaction catalyst may be present in an amount of at least about 2% by weight, at least about 4% by weight, at least about 6% by weight, at least about 8% by weight, or higher, based on the total weight of the mixed extrusion product.

Following the mixing of the extrusion product with the process solvent and the reaction catalyst, the process feed stream may be fed to a multi-tray reactive distillation column. The particular configuration of the multi-tray reactive distillation column may vary and it should be understood that any multi-tray reactive distillation column as described herein above would be suitable for use in these methods. In one or more embodiments, the process feed stream is fed onto a tray of the multi-tray reactive distillation column via a feed stream inlet. In such embodiments, the multi-tray reactive distillation column may be designed to facilitate further depolymerization of at least another portion of the plurality of plastic polymers in the process feed stream in the presence of the reaction catalyst. In some embodiments, for example, the multi-tray reactive distillation column may provide countercurrent flow of the process feed stream downward through the multi-tray reactive distillation column and at least partially depolymerized plastic polymer vapors upward through the multi-tray reactive distillation column, thereby enhancing naphtha yield.

In one or more embodiments, methods include removing a distillate via one or more distillate side streams connected to the multi-tray reactive distillation column. As noted herein, the positioning and/or configuration of the one or more distillate side streams may vary as desired based on the product to be recovered and the arrangement of the multi-tray reactive distillation column. In some embodiments, at least one of the distillate side streams may be configured to recover a flow of naphtha from the multi-tray reactive distillation column. In some embodiments, the multi-tray reactive distillation column may include one or more additional distillate side streams configured to recover naphtha or other blend stocks or products therefrom. In addition to the one or more distillate side streams, the multi-tray reactive distillation column may include a bottoms stream connected to a bottom end portion of the multi-tray reactive distillation column that is designed to remove a flow of the process solvent, unreacted plastic polymers, reaction catalyst and/or coke/char therefrom.

As noted above, in some embodiments, the bottoms stream may be separated into one or more individual streams, for example, which may individually be connected to and in fluid communication with one or more additional components (e.g., such as a reboiler and/or a separation unit and/or a recycle stream). Typically, at least a portion of the reaction catalyst and coke may be separated from the bottoms stream, for example, using one or more filters (e.g., using a separation unit) configured to receive a flow from the bottoms stream. In certain embodiments, the at least a portion of the process solvent and the unreacted plastic polymers in the bottoms stream may be recovered and returned to the process to mix with the extrusion product that exits the reactive extrusion vessel. In further embodiments, the disclosed methods may include passing at least a portion of the bottoms stream to a reboiler to vaporize at least some of the bottoms stream for reinjection into the multi-tray reactive distillation column.

As noted herein and as depicted in FIG. 2, some embodiments of methods disclosed herein may include passing the extrusion product to a plug flow reactor positioned upstream of the multi-tray reactive distillation column. In such embodiments, the plug flow reactor can be operated for a time and at a temperature sufficient to cause further depolymerization of at least a second portion of the plurality of plastic polymers in the extrusion product in the presence of the reaction catalyst to produce a reactor product outlet stream. Subsequently, the reactor product outlet stream may be passed to the multi-tray reactive distillation column such that the reactor product outlet stream is fed onto a tray of the multi-tray reactive distillation column. In one or more embodiments, the time and temperature sufficient to cause depolymerization of the at least a second portion of the plurality of polymers in the extrusion product is between about 30 to about 60 minutes and about 400 °C to about 450 °C. In certain embodiments, thermogravimetric analysis (TGA) data shows that for polyolefins, the initial breakdown starts at about 400 °C, while for polystyrene, the initial breakdown starts at about 325 °C. Most of the polymers, except for PVC, start breaking down at less than about 325 °C. Here again, it should be noted that the use of the plug flow reactor can advantageously reduce the required size of the multi-tray distillation column and/or the amount of time required for operation of the multi-tray reactive distillation column. For example, as the plug flow reactor provides a certain amount of further depolymerization of the plurality of plastic polymers in the mixed plastic waste, less depolymerization is necessary in the multi-tray reactive distillation column to recover the desired products (e.g., such as naphtha).

When ranges are disclosed herein, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, reference to values stated in ranges includes each and every value within that range, even though not explicitly recited. Thus, every point or individual value may serve as its own lower or upper limit combined with any other point or individual value or any other lower or upper limit, to recite a range not explicitly recited.

Having the benefit of the teachings presented in the foregoing descriptions, many modifications and other embodiments of the disclosure set forth herein will come to mind to those skilled in the art to which these disclosures pertain. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of processing a mixed plastic waste, the method comprising:

introducing a mixed plastic waste into a first reactive extrusion vessel, the mixed plastic waste including a plurality of plastic polymers;

operating the first reactive extrusion vessel at a temperature sufficient to cause initial dechlorination of any chlorine-containing polymers in the plurality of plastic polymers;

passing the mixed plastic waste from the first reactive extrusion vessel to a second reactive extrusion vessel;

operating the second reactive extrusion vessel at a temperature sufficient to cause initial depolymerization of a portion of the plurality of plastic polymers in the mixed plastic waste to produce an extrusion product;

mixing the extrusion product from the second reactive extrusion vessel with a process solvent and a reaction catalyst to define a process feed stream, the process solvent being one or more of a carbon black oil, a heavy cat cycle oil, a vacuum gas oil, or any hydrocarbon with a boiling point ranging from about 300 °C to about 565 °C;

passing the process feed stream to a multi-tray reactive distillation column, the process feed stream being fed onto a tray of the multi-tray reactive distillation column;

operating the multi-tray reactive distillation column to facilitate depolymerization of at least another portion of the plurality of plastic polymers in the process feed stream in the presence of the reaction catalyst;

removing a distillate via one or more distillate side streams connected to the multi-tray reactive distillation column, the distillate including at least naphtha;

removing a portion of the process solvent, unreacted plastic polymers, reaction catalyst and coke via a bottoms stream connected to a bottom end portion of the multi-tray reactive distillation column;

separating at least a portion of the reaction catalyst and the coke from the bottoms stream; and returning at least a portion of the process solvent and the unreacted plastic polymers in the bottoms stream to mix with the extrusion product that exits the reactive extrusion vessel.

2. The method of claim 1, further comprising:

passing hydrogen chloride gas evolved from the initial dechlorination of the chlorine-containing polymers in the plurality of plastic polymers to a gas-liquid contactor containing an aqueous base; and reacting the hydrogen chloride gas with the aqueous base from the gas-liquid contactor to produce a non-volatile product.

3. The method of claim 1, further comprising:

causing at least one of a stripping steam or a stripping hydrogen gas to be injected proximate to a bottom end portion of the multi-tray reactive distillation column.

4. The method of claim 1, further comprising:

adding a hydrogen donor solvent to the second reactive extrusion vessel with the mixed plastic waste; and causing a transfer of hydrogen from the hydrogen donor solvent to free radical compounds created during the initial depolymerization of the plurality of plastic polymers in the mixed plastic waste.

5. The method of claim 1, further comprising:

adding gaseous hydrogen with a transition metal catalyst and a sulfur-containing compound to the second reactive extrusion vessel with the mixed plastic waste; and causing a transfer of hydrogen from the gaseous hydrogen to free radical compounds created during the initial depolymerization of the plurality of plastic polymers in the mixed plastic waste.

6. The method of claim 5, wherein the transition metal catalyst is molybdenum octoate or molybdenum naphthenate.

7. The method of claim 5, wherein the sulfur-containing compound is butyl sulfide.

8. The method of claim 1, further comprising:

passing at least a portion of the bottoms stream to a reboiler to vaporize at least some of the bottoms stream; and injecting vaporized bottoms stream onto a lower tray of the reactive distillation column.

9. The method of claim 1, further comprising:

feeding the mixed plastic waste to a shredder prior to introducing the mixed plastic waste into the first reactive extrusion vessel; and shredding the mixed plastic waste in the shredder to provide a shredded mixed plastic waste.

10. The method of claim 1, further comprising:

passing the process feed stream to a plug flow reactor positioned upstream of the multi-tray reactive distillation column;

operating the plug flow reactor for a time and at a temperature sufficient to cause depolymerization of at least a second portion of the plurality of plastic polymers in the process feed stream in the presence of the reaction catalyst to produce a reactor product outlet stream; and passing the reactor product outlet stream to the multi-tray reactive distillation column, the reactor product outlet stream being fed onto a tray of the multi-tray reactive distillation column.

11. The method of claim 1, wherein the process feed stream consists of the extrusion product from the second reactive extrusion vessel, the process solvent, and the reaction catalyst.

12. The method of claim 1, wherein the operating of the multi-tray reactive distillation column comprises operating the multi-tray reactive distillation column under vacuum.

* * * * *